(12) United States Patent
Sillanpaa et al.

(10) Patent No.: US 12,267,771 B2
(45) Date of Patent: Apr. 1, 2025

(54) APPARATUS, METHOD, AND COMPUTER PROGRAM

(71) Applicant: NOKIA TECHNOLOGIES OY, Espoo (FI)

(72) Inventors: Anna Sillanpaa, Helsinki (FI); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 362 days.

(21) Appl. No.: 17/609,977

(22) PCT Filed: May 10, 2019

(86) PCT No.: PCT/EP2019/062054
§ 371 (c)(1),
(2) Date: Nov. 9, 2021

(87) PCT Pub. No.: WO2020/228926
PCT Pub. Date: Nov. 19, 2020

(65) Prior Publication Data
US 2022/0210726 A1    Jun. 30, 2022

(51) Int. Cl.
*H04W 48/18*     (2009.01)
*H04W 60/00*     (2009.01)

(52) U.S. Cl.
CPC .......... *H04W 48/18* (2013.01); *H04W 60/00* (2013.01)

(58) Field of Classification Search
CPC .............................. H04W 48/18; H04W 60/00
See application file for complete search history.

(56) References Cited

U.S. PATENT DOCUMENTS

| | | | |
|---|---|---|---|
| 11,272,552 B2* | 3/2022 | Ha | H04W 48/16 |
| 11,570,694 B2* | 1/2023 | Choi | H04W 48/08 |
| 11,601,990 B2* | 3/2023 | Aramoto | H04W 36/22 |
| 11,805,472 B2* | 10/2023 | Adjakple | H04W 48/18 |
| 2017/0303259 A1 | 10/2017 | Lee et al. | |
| 2017/0367036 A1* | 12/2017 | Chen | H04L 41/122 |
| 2017/0367120 A1* | 12/2017 | Murray | H04W 72/046 |

(Continued)

FOREIGN PATENT DOCUMENTS

| | | | |
|---|---|---|---|
| CN | 109688560 A | * | 4/2019 |
| WO | 2017/200978 A1 | | 11/2017 |

(Continued)

OTHER PUBLICATIONS

LG Electronics Inc: Allowed NSSAI in NG-RAN11 , 3GPP Draft; R3-183063, 3rd Generation Partnership Project (3GPP), vol. RAN WG3, Busan, Korea; May 21, 2018-May 25, 2018 (May 25, 2018), XP051445554 (Year: 2018).*

(Continued)

*Primary Examiner* — Yuwen Pan
*Assistant Examiner* — Swati Jain
(74) *Attorney, Agent, or Firm* — Robert P. Michal, Esq.; Carter, DeLuca & Farrell LLP

(57) ABSTRACT

An apparatus comprising: at least one processor; and at least one memory including computer program code; the at least one memory and the computer program code configured to, with the at least one processor, cause the apparatus at least to: identify a plurality of allowed network slices of a terminal; and select at least one network slice among the plurality of allowed network slices of the terminal to be used for at least one signalling connection.

1 Claim, 26 Drawing Sheets

---

1902 Identifying a plurality of allowed network slices of a terminal

1904 Receiving network slice selection assistance information

1906 Selecting at least one network slice among the plurality of allowed network slices of the terminal to be used for at least one signalling connection based on the network slice selection assistance information

1908 Sending the selected at least one network slice

1910 Using the selected at least one network slice for the at least one signalling connection

(56) References Cited

U.S. PATENT DOCUMENTS

| | | | |
|---|---|---|---|
| 2018/0270712 A1* | 9/2018 | Faccin | H04W 28/16 |
| 2018/0270744 A1 | 9/2018 | Griot et al. | |
| 2018/0332523 A1* | 11/2018 | Faccin | H04W 36/14 |
| 2019/0028961 A1 | 1/2019 | Faccin et al. | |
| 2019/0029065 A1 | 1/2019 | Park et al. | |
| 2019/0037409 A1 | 1/2019 | Wang et al. | |
| 2019/0075552 A1* | 3/2019 | Yu | H04W 24/10 |
| 2019/0123963 A1* | 4/2019 | Tang | H04L 45/64 |
| 2019/0149998 A1* | 5/2019 | Yang | H04L 41/0896 |
| | | | 370/328 |
| 2019/0159108 A1* | 5/2019 | Lee | H04W 76/27 |
| 2019/0174536 A1* | 6/2019 | Han | H04W 74/002 |
| 2019/0200285 A1* | 6/2019 | Velev | H04W 60/00 |
| 2019/0239136 A1* | 8/2019 | Faccin | H04W 36/14 |
| 2019/0357136 A1* | 11/2019 | Li | H04W 48/18 |
| 2020/0077327 A1* | 3/2020 | Duan | H04W 76/11 |
| 2020/0120580 A1* | 4/2020 | Jin | H04W 48/02 |
| 2020/0163008 A1* | 5/2020 | Hedman | H04W 36/12 |
| 2020/0178196 A1* | 6/2020 | Wang | H04W 76/16 |
| 2020/0187088 A1* | 6/2020 | Chun | H04W 48/02 |
| 2020/0252862 A1* | 8/2020 | Kim | H04W 8/08 |
| 2020/0305118 A1* | 9/2020 | Ryu | H04W 76/10 |
| 2020/0314740 A1* | 10/2020 | Lee | H04W 48/08 |
| 2021/0185602 A1* | 6/2021 | Wang | H04W 48/18 |
| 2021/0195509 A1* | 6/2021 | Ohlsson | H04W 12/037 |
| 2021/0227444 A1* | 7/2021 | Faccin | H04W 8/12 |
| 2021/0266820 A1* | 8/2021 | Lou | H04W 36/0069 |
| 2021/0344759 A1* | 11/2021 | Ouyang | H04L 67/141 |
| 2021/0410060 A1* | 12/2021 | Ianev | H04W 48/18 |
| 2022/0039177 A1* | 2/2022 | Talebi Fard | H04W 48/00 |
| 2022/0078692 A1* | 3/2022 | Stojanovski | H04W 36/0033 |
| 2022/0116866 A1* | 4/2022 | Lee | H04W 68/005 |
| 2022/0173950 A1* | 6/2022 | Sengupta | H04L 27/2602 |
| 2023/0027227 A1* | 1/2023 | Qiao | H04W 24/10 |
| 2023/0041734 A1* | 2/2023 | Jin | H04W 76/11 |
| 2023/0189120 A1* | 6/2023 | Wirth | H04W 48/02 |
| | | | 455/435.3 |
| 2023/0232317 A1* | 7/2023 | Li | H04W 8/24 |
| | | | 370/329 |
| 2023/0247716 A1* | 8/2023 | Hong | H04W 28/0226 |
| 2023/0254766 A1* | 8/2023 | Ianev | H04W 48/18 |
| | | | 455/435.3 |
| 2023/0300731 A1* | 9/2023 | Lee | H04W 12/08 |
| | | | 370/328 |
| 2023/0353396 A1* | 11/2023 | Qiao | H04W 80/10 |
| 2023/0362946 A1* | 11/2023 | Adjakple | H04W 72/54 |
| 2023/0422208 A1* | 12/2023 | Ryu | H04W 68/005 |
| 2024/0107383 A1* | 3/2024 | Faccin | H04W 16/04 |

FOREIGN PATENT DOCUMENTS

| | | |
|---|---|---|
| WO | WO 2018/157439 A1 | 9/2018 |
| WO | 2018/233808 A1 | 12/2018 |

OTHER PUBLICATIONS

Wei, H., Zhang, Z., & Fan, B. (2018). Network slice access selection scheme in 5G doi:http://dx.doi.org/10.1109/ITNEC.2017.8284751 (Year: 2018).*

"3rd Generation Partnership Project; Technical Specification Group Services and System Aspects; Study on Enhancement of Network Slicing (Release 16)", 3GPP TR 23.740, V16.0.0, Dec. 2018, pp. 1-70.

Jiang et al., "Network slicing management & prioritization in 5G mobile systems", 22th European Wireless Conference, May 18-20, 2016, pp. 197-202.

Office action received for corresponding European Patent Application No. 19724769.5, dated Feb. 5, 2024, 6 pages.

International Search Report and Written Opinion dated Sep. 3, 2019 corresponding to International Patent Application No. PCT/EP2019/062054.

LG Electronics Inc., "Consideration on Allowed NSSAI in NG-RAN," 3GPP Draft; R3-183063, 3GPP TSG-RAN WG3 Meeting #100, Busan, Korea, May 20, 2018, XP051445554.

Nokia et al., "Signalling of Allowed NSSAI," 3GPP Draft, R3-182600, 3GPP TSG-RAN WG3#100, Busan, Korea, May 20, 2018, XP051445104.

* cited by examiner

APPARATUS, METHOD, AND COMPUTER PROGRAM

FIELD OF THE DISCLOSURE

The present disclosure relates to an apparatus, a method, and a computer program for managing network slices for signalling (e.g. only) connections (e.g. radio resource control connection or new generation access protocol connection).

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: identify a plurality of allowed network slices of a terminal; and select at least one network slice among the plurality of allowed network slices of the terminal to be used for at least one signalling connection.

The at least one memory and the computer program code may be configured to, with the at least one processor, cause the apparatus at least to: receive network slice selection assistance information; and select the at least one network slice among the plurality of allowed network slices to be used for at least one signalling connection based on the network slice selection assistance information.

The network slice selection assistance information may comprise at least one proposed network slice among the plurality of allowed network slices.

The at least one memory and the computer program code may be configured to, with the at least one processor, cause the apparatus at least to: apply a priority or default order with respect to the plurality of allowed network slices.

The priority or default order with respect to the plurality of allowed network slices may be provided by a core network entity.

Certain of the plurality of allowed network slices may have a higher priority by default than other of the allowed network slices.

The at least one memory and the computer program code may be configured to, with the at least one processor, cause the apparatus at least to: provide the terminal with a temporary slice quota until the network slice selection assistance information is confirmed.

The at least one memory and the computer program code may be configured to, with the at least one processor, cause the apparatus at least to: verify a network slice quota of all other or pre-determined connected terminals before selecting the at least one network slice for the terminal.

The network slice selection assistance information may be included within a radio resource control set up complete message.

The network slice selection assistance information may be included within a non-access stratum message.

The network slice selection assistance information may be included within an initial terminal message.

The at least one signalling connection may comprise a signalling only connection.

The signalling connection may comprise a radio resource control connection.

The signalling connection may comprise a new generation application protocol connection.

The apparatus may be a core network apparatus.

The apparatus may be a radio access network apparatus.

The at least one memory and the computer program code may be configured to, with the at least one processor, cause the apparatus at least to: send the selected at least one network slice.

According to an aspect there is provided an apparatus comprising circuitry configured to: identify a plurality of allowed network slices of a terminal; and select at least one network slice among the plurality of allowed network slices of the terminal to be used for at least one signalling connection.

The circuitry may be configured to: receive network slice selection assistance information; and select the at least one network slice among the plurality of allowed network slices to be used for at least one signalling connection based on the network slice selection assistance information.

The network slice selection assistance information may comprise at least one proposed network slice among the plurality of allowed network slices.

The circuitry may be configured to: apply a priority or default order with respect to the plurality of allowed network slices.

The priority or default order with respect to the plurality of allowed network slices may be provided by a core network entity.

Certain of the plurality of allowed network slices may have a higher priority by default than other of the allowed network slices.

The circuitry may be configured to: provide the terminal with a temporary slice quota until the network slice selection assistance information is confirmed.

The circuitry may be configured to: verify a network slice quota of all other connected terminals before selecting the at least one network slice for the terminal.

The network slice selection assistance information may be included within a radio resource control set up complete message.

The network slice selection assistance information may be included within a non-access stratum message.

The network slice selection assistance information may be included within an initial terminal message.

The at least one signalling connection may comprise a signalling only connection.

The signalling connection may comprise a radio resource control connection.

The signalling connection may comprise a new generation application protocol connection.

The apparatus may be a core network apparatus.

The apparatus may be a radio access network apparatus.

The circuitry may be configured to: send the selected at least one network slice.

According to an aspect there is provided an apparatus comprising means for: identifying a plurality of allowed network slices of a terminal; and selecting at least one network slice among the plurality of allowed network slices of the terminal to be used for at least one signalling connection.

The apparatus may comprise means for: receiving network slice selection assistance information; and selecting the at least one network slice among the plurality of allowed network slices to be used for at least one signalling connection based on the network slice selection assistance information.

The network slice selection assistance information may comprise at least one proposed network slice among the plurality of allowed network slices.

The apparatus may comprise means for: applying a priority or default order with respect to the plurality of allowed network slices.

The priority or default order with respect to the plurality of allowed network slices may be provided by a core network entity.

Certain of the plurality of allowed network slices may have a higher priority by default than other of the allowed network slices.

The apparatus may comprise means for: providing the terminal with a temporary slice quota until the network slice selection assistance information is confirmed.

The apparatus may comprise means for: verifying a network slice quota of all other or pre-determined connected terminals before selecting the at least one network slice for the terminal.

The network slice selection assistance information may be included within a radio resource control set up complete message.

The network slice selection assistance information may be included within a non-access stratum message.

The network slice selection assistance information may be included within an initial terminal message.

The at least one signalling connection may comprise a signalling only connection.

The signalling connection may comprise a radio resource control connection.

The signalling connection may comprise a new generation application protocol connection.

The apparatus may be a core network apparatus.

The apparatus may be a radio access network apparatus.

The apparatus may comprise means for: sending the selected at least one network slice.

According to an aspect there is provided a method comprising: identifying a plurality of allowed network slices of a terminal; and selecting at least one network slice among the plurality of allowed network slices of the terminal to be used for at least one signalling connection.

The method may comprise: receiving network slice selection assistance information; and selecting the at least one network slice among the plurality of allowed network slices to be used for at least one signalling connection based on the network slice selection assistance information.

The network slice selection assistance information may comprise at least one proposed network slice among the plurality of allowed network slices.

The method may comprise: applying a priority or default order with respect to the plurality of allowed network slices.

The priority or default order with respect to the plurality of allowed network slices may be provided by a core network entity.

Certain of the plurality of allowed network slices may have a higher priority by default than other of the allowed network slices.

The method may comprise: providing the terminal with a temporary slice quota until the network slice selection assistance information is confirmed.

The method may comprise: verifying a network slice quota of all other or pre-determined connected terminals before selecting the at least one network slice for the terminal.

The network slice selection assistance information may be included within a radio resource control set up complete message.

The network slice selection assistance information may be included within a non-access stratum message.

The network slice selection assistance information may be included within an initial terminal message.

The at least one signalling connection may comprise a signalling only connection.

The signalling connection may comprise a radio resource control connection.

The signalling connection may comprise a new generation application protocol connection.

The method may be performed by a core network apparatus.

The method may be performed by a radio access network apparatus.

The method may comprise: sending the selected at least one network slice.

According to an aspect there is provided a computer program comprising computer executable code which when run on at least one processor is configured to: identify a plurality of allowed network slices of a terminal; and select at least one network slice among the plurality of allowed network slices of the terminal to be used for at least one signalling connection.

The computer program may comprise computer executable code which when run on at least one processor is configured to: receive network slice selection assistance information; and select the at least one network slice among the plurality of allowed network slices to be used for at least one signalling connection based on the network slice selection assistance information.

The network slice selection assistance information may comprise at least one proposed network slice among the plurality of allowed network slices.

The computer program may comprise computer executable code which when run on at least one processor is configured to: apply a priority or default order with respect to the plurality of allowed network slices.

Certain of the plurality of allowed network slices may have a higher priority by default than other of the allowed network slices.

The computer program may comprise computer executable code which when run on at least one processor is configured to: provide the terminal with a temporary slice quota until the network slice selection assistance information is confirmed.

The computer program may comprise computer executable code which when run on at least one processor is configured to: verify a network slice quota of all other or pre-determined connected terminals before selecting the at least one network slice for the terminal.

The network slice selection assistance information may be included within a radio resource control set up complete message.

The network slice selection assistance information may be included within a non-access stratum message.

The network slice selection assistance information may be included within an initial terminal message.

The at least one signalling connection may comprise a signalling only connection.

The signalling connection may comprise a radio resource control connection.

The signalling connection may comprise a new generation application protocol connection.

According to an aspect there is provided an apparatus comprising at least one processor and at least one memory including computer code for one or more programs, the at least one memory and the computer code configured, with the at least one processor, to cause the apparatus at least to: receive at least one network slice selected among a plurality of allowed network slices of a terminal to be used for at least one signalling connection; and use the at least one network slice selected among the plurality of allowed network slices of the terminal for the at least one signalling connection.

The at least one memory and the computer program code may be configured to, with the at least one processor, cause the apparatus at least to: send network slice selection assistance information to a radio access network entity.

The network slice selection assistance information may comprise at least one proposed network slice among the plurality of allowed network slices.

The at least one memory and the computer program code may be configured to, with the at least one processor, cause the apparatus at least to: receive a temporary slice quota until the network slice selection assistance information is confirmed.

The network slice selection assistance information may be included within a radio resource control set up complete message.

The at least one memory and the computer program code may be configured to, with the at least one processor, cause the apparatus at least to: receive the plurality of allowed network slices of the terminal with priority or default information.

The priority or default information may be provided by a core network entity.

The at least one memory and the computer program code may be configured to, with the at least one processor, cause the apparatus at least to: select at least one of the plurality of allowed network slices of the terminal to be used for a data connection based on the priority or default information.

The apparatus may be the terminal.

According to an aspect there is provided an apparatus comprising circuitry configured to: receive at least one network slice selected among a plurality of allowed network slices of a terminal to be used for at least one signalling connection; and use the at least one network slice selected among the plurality of allowed network slices of the terminal for the at least one signalling connection.

The circuitry may be configured to: send network slice selection assistance information to a radio access network entity.

The network slice selection assistance information may comprise at least one proposed network slice among the plurality of allowed network slices.

The circuitry may be configured to: receive a temporary slice quota until the network slice selection assistance information is confirmed.

The network slice selection assistance information may be included within a radio resource control set up complete message.

The circuitry may be configured to: receive the plurality of allowed network slices of the terminal with priority or default information.

The priority or default information may be provided by a core network entity.

The circuitry may be configured to: select at least one of the plurality of allowed network slices of the terminal to be used for a data connection based on the priority or default information.

The apparatus may be the terminal.

According to an aspect there is provided an apparatus comprising means for: receiving at least one network slice selected among a plurality of allowed network slices of a terminal to be used for at least one signalling connection; and using the at least one network slice selected among the plurality of allowed network slices of the terminal for the at least one signalling connection.

The apparatus may comprise means for: sending network slice selection assistance information to a radio access network entity.

The network slice selection assistance information may comprise at least one proposed network slice among the plurality of allowed network slices.

The apparatus may comprise means for: receiving a temporary slice quota until the network slice selection assistance information is confirmed.

The network slice selection assistance information may be included within a radio resource control set up complete message.

The apparatus may comprise means for: receiving the plurality of allowed network slices of the terminal with priority or default information.

The priority or default information may be provided by a core network entity.

The apparatus may comprise means for: selecting at least one of the plurality of allowed network slices of the terminal to be used for a data connection based on the priority or default information.

The apparatus may be the terminal.

According to an aspect there is provided a method comprising: receiving at least one network slice selected among a plurality of allowed network slices of a terminal to be used for at least one signalling connection; and using the at least one network slice selected among the plurality of allowed network slices of the terminal for the at least one signalling connection.

The method may comprise: sending network slice selection assistance information to a radio access network entity.

The network slice selection assistance information may comprise at least one proposed network slice among the plurality of allowed network slices.

The method may comprise: receiving a temporary slice quota until the network slice selection assistance information is confirmed.

The network slice selection assistance information may be included within a radio resource control set up complete message.

The method may comprise: receiving the plurality of allowed network slices of the terminal with priority or default information.

The priority or default information may be provided by a core network entity.

The method may comprise: selecting at least one of the plurality of allowed network slices of the terminal to be used for a data connection based on the priority or default information.

The method may be performed by a terminal.

According to an aspect there is provided a computer program comprising computer executable code which when run on at least one processor is configured to: receive at least one network slice selected among a plurality of allowed network slices of a terminal to be used for at least one signalling connection; and use the at least one network slice selected among the plurality of allowed network slices of the terminal for the at least one signalling connection.

The computer program may comprise computer executable code which when run on at least one processor is configured to: send network slice selection assistance information to a radio access network entity.

The network slice selection assistance information may comprise at least one proposed network slice among the plurality of allowed network slices.

The computer program may comprise computer executable code which when run on at least one processor is configured to: receive a temporary slice quota until the network slice selection assistance information is confirmed.

The network slice selection assistance information may be included within a radio resource control set up complete message.

The computer program may comprise computer executable code which when run on at least one processor is configured to: receive the plurality of allowed network slices of the terminal with priority or default information.

The priority or default information may be provided by a core network entity.

The computer program may comprise computer executable code which when run on at least one processor is configured to: select at least one of the plurality of allowed network slices of the terminal to be used for a data connection based on the priority or default information.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
CU: Centralized Unit
DN: Data Network
DRB: Data Radio Bearer
DU: Distributed Unit
GBR: Guaranteed Bit Rate
GNB: gNodeB
GSM: Global System for Mobile communication
IoT: Internet of Things
LTE: Long Term Evolution
NAS: Non-Access Stratum
NEF: Network Exposure Function
NR: New Radio
MS: Mobile Station
MTC: Machine Type Communication
NGAP: New Generation Application Protocol
NSI: Network Slice Instance
NSSAI: Network Slice Selection Assistance Information
NSSI: Network Slice Subnet Instance
PCF: Policy Control Function
RAM: Random Access Memory
RAN: Radio Access Network
ROM: Read Only Memory
RRC: Radio Resource Control
SMF: Session Management Function
S-NSSAI: Single Network Slice Selection Assistance Information
SRB: Signalling Radio Bearer
UDM: User Data Management
UE: User Equipment
UMTS: Universal Mobile Telecommunication System
UPF: User Plane Function
URLLC: Ultra Reliable Low Latency Communication
URSP: UE Route Selection Policy
USB: Universal Serial Bus
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which.

FIG. 4a shows a schematic representation of network slices of a network;

FIG. 4b shows a schematic representation of one of the network slices of FIG. 4a;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
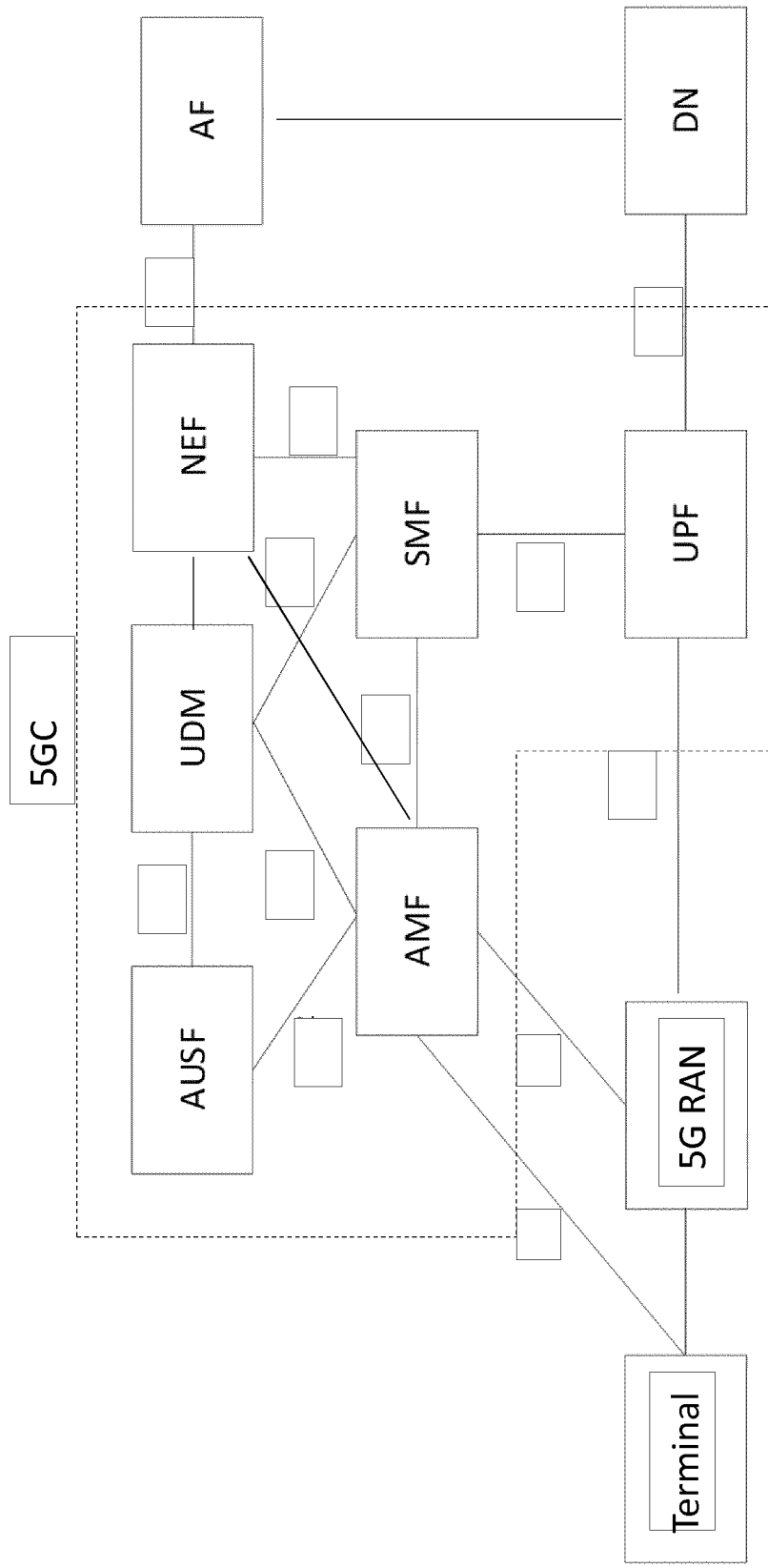
FIG. 1 shows a schematic representation of a 5G system.

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (GNB) distributed unit functions (GNBDUFunctions) connected to one or more gNodeB (GNB) centralized unit functions (GNBCUFunctions).

The 5GC may comprise an access management function (AMF), a session management function (SMF), an authentication server function (AUSF), a user data management (UDM), a user plane function (UPF) and/or a network exposure function (NEF).

Figure 2:
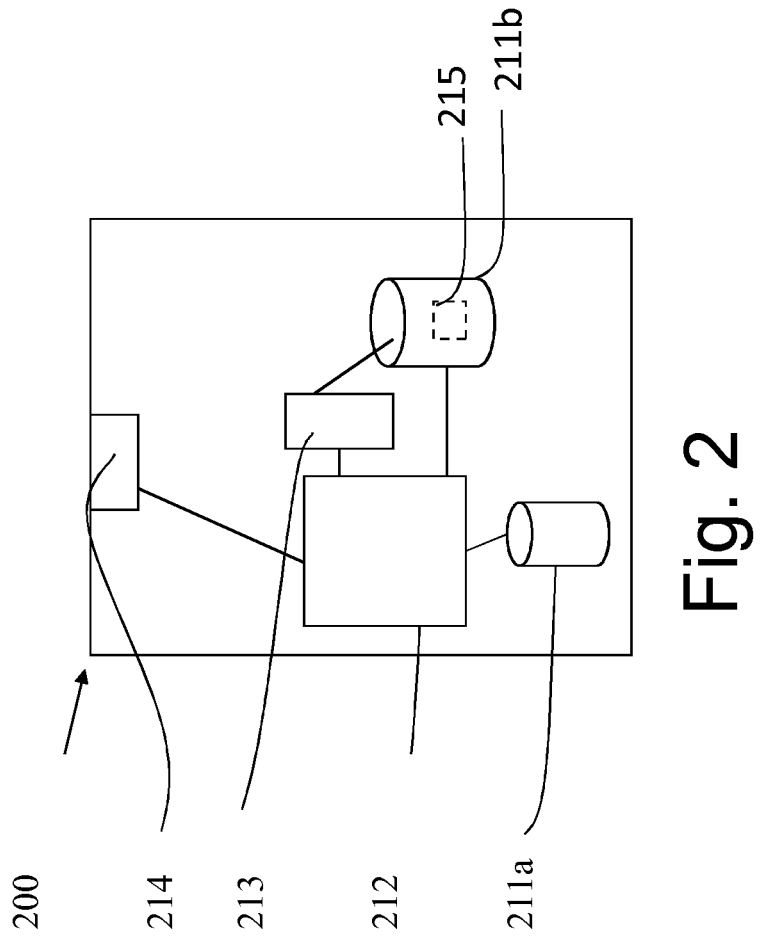
FIG. 2 shows a schematic representation of a control apparatus.

FIG. 2 illustrates an example of a control apparatus 200 for controlling a function, such as a function of the 5G RAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. Via the input/output interface 214 may be coupled to other components of the function of the 5G RAN or the 5GC. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G RAN or of the 5GC. In some embodiments, each function of the 5G RAN or the 5GC comprises a control apparatus 200. In alternative embodiments, two or more functions of the 5G RAN or the 5GC may share a control apparatus.

Figure 3:
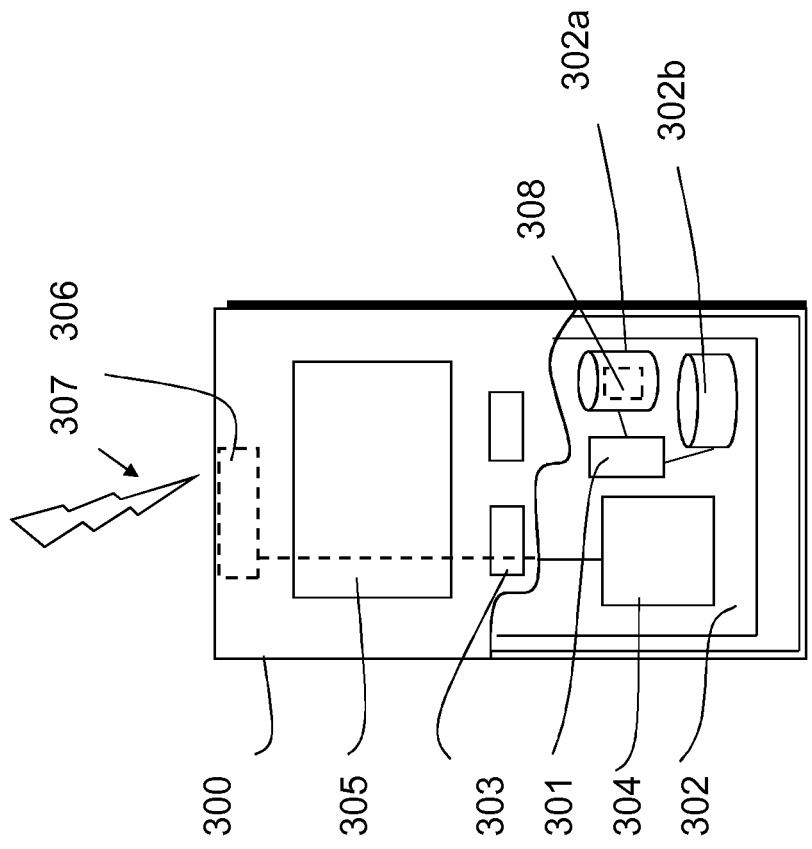
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding aspects relate to 5G systems, it will be understood that similar aspects may relate to other mobile systems, in particular, LTE systems (e.g. LTE systems connected to 5G systems).

Mobile systems, like LTE systems or 5G systems, comprise physical resources. These physical resources may be shared to offer multiple virtual networks to users. These virtual networks, called "slices", may be designed to offer specific properties like high bandwidth, low latency, or to support a huge number of IoT devices. These slices may serve different users with different service level agreements. The slices may be isolated/independent from each other. To be able to offer slices on demand, various mechanisms have been proposed to create, activate, de-activate and delete slices quickly.

Figure 4:
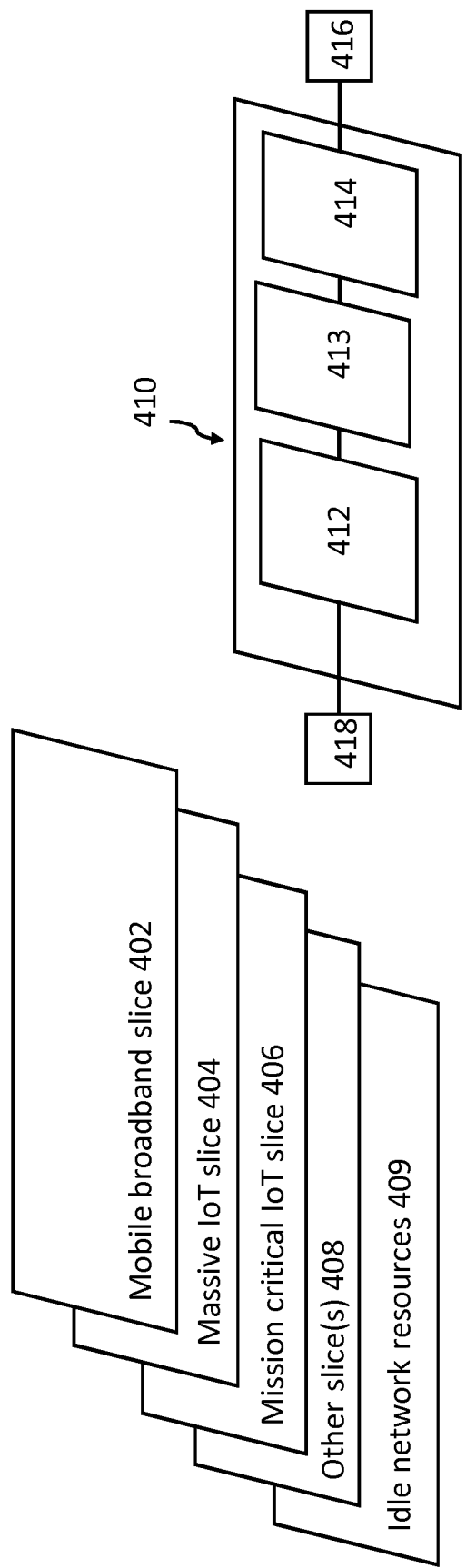

FIG. 4a shows a schematic representation of a physical network sliced into multiple virtual networks (i.e. network slices). The network slices may comprise a mobile broadband slice 402, a massive Internet of Things (IoT) slice 404, a mission critical IoT slice 406 and/or one or more other slices 408. The physical network may comprise idle network resources 409 (i.e. resources that are not allocated to any network slice).

The mobile broadband slice 402 may be associated with communication services, entertainment services and/or Internet services. The massive IoT slice 404 may be associated with retail services, shipping services, logistics services, agriculture services, climate services and/or manufacturing services. The mission critical IoT slice 406 may be associated with automotive services, medical services and/or infrastructure services. The one or more other slices 408 may be associated with one or more other services.

FIG. 4b shows a schematic representation a network slice 410. The network slice 410 comprises one or more subnetworks 412, 413 and 414. The subnetwork 412 may be a radio access subnetwork. The subnetwork 413 may be a transport subnetwork. The subnetwork 414 may be a core subnetwork. The subnetwork 412 may be connected to one or more terminals 418. The subnetwork 416 may be connected to one or more radio access functions or data networks 420.

3GPP Rel-15 New Radio Standards relates to the concept of network slicing. Network slicing provides the means for the operator to classify users in different manner to provide them different services, different level of service, different charging etc.

Network slicing is an aspect of the new radio and UE's allowed network slices are provided to RAN from CN with UE's initial context setup over new generation application protocol (NGAP). It may be used to determine UE's mobility (e.g. handover target cell is selected as well as possible based on UE's allowed network slices). A UE can have up to eight allowed network slices.

Each packet data unit (PDU) session and related data radio bearers (DRBs) in RAN may belong to one network slice. A UE and the CN may determine the network slice for each PDU session based on pre-configurations, subscription information, used application or other.

A UE and the CN may contain information on the UE's default network slice selection assistance information (NSSAI). For example, one or more subscribed NSSAI may be marked as default by operator configuration. A UE may be pre-configured with default configured NSSAI or it may be configured over the air. The default configured NSSAI may be configured by a home public land mobile network (HPLMN) but may apply to any PLMNs for which there is no specific NSSAI. Default NSSAI may be used unless there is configured allowed NSSAI that is applicable.

A UE may also configure NSSAI/S-NSSAIs with or without related application applicability information (i.e. to which applications are used the NSSAI/S-NSSAI). This information can be pre-configured in the UE or configured over the air by the CN.

As RAN resources may be scarce, typically there is limited number of radio resource control (RRC) connections (and/or other resources such as DRBs) that can be supported per cell, cell group/sector, DU, CU, gNB. Then, especially for congestion situations but also to ensure that certain network slices are not supported with more resources (e.g. RRC connections) than the operator wishes, 3GPP Rel-15/16 SON has defined RAN resource model guidelines to allow an operator to control RAN resource use for different network slices (e.g. number of RRC connections per slice).

The default configured NSSAI may not be known by the RAN. So, for RRC connected users, all the CN provided allowed S-NSSAIs are equal. So, without any primary, preferred, used, to be used or default network slice information the RAN cannot associate the RRC connection to any slice. Furthermore, with control plane only traffic, such as short message system (SMS) over non-access stratum NAS or other signalling traffic that the operator may want to restrict or prioritize, the RAN may not do this in reliable manner without being provided the network slice information relevant to the RRC connection or such traffic.

Thus, one or more of the present aspects relate to the provision of the primary, preferred, used, to be used, or default network slice information for RRC connection signaling (e.g. between a UE and CN) and/or user data over control-plane (e.g. SMS over NAS, location services, etc.) for CN to RAN (and possibly vice versa).

One or more of the present aspects relate to indicating that a particular network slice is not available due to network slice specific resources not being available (e.g. for RRC connection, signaling, location information, control plane based user data (such as SMS over NAS but also for data radio bearer (DRB), non-guaranteed bit rate (non-GBR), GBR, ultra reliable low latency communication (URLLC), Internet of Things (IoT), machine type communication (MTC), etc.). The information could also be provided from the CN (or the RAN) to UE, or vice versa.

One or more of the present aspects relate to the provision (and determination) of the preferred network slice(s) registered and RRC connected user (without active PDU session).

One or more of the present aspects relate to default network slice (e.g. indication that specific network slice is default network slice), to be used for user admission control in the RAN and/or the CN (e.g. when there are restricted number of users allowed to a network slice).

One or more of the present aspects relate to a UE or the CN providing selected network slice for a RRC connection. A UE may provide this in NAS and/or RRC signaling when moving from RRC idle to RRC connected, when a UE (or the CN) activates a PDU session or when signaling only connection is established.

One or more of the present aspects relate to default network slice for control plane only signaling being assumed if no other information is given.

One or more of the present aspects relate to priority order for the network slices (e.g. order in which the network slices may be sent so that first has the highest priority (e.g. default), the second has the second highest priority, etc. Alternatively, the network slices may be sent with numeric order/priority indication "1", "2", etc.

One or more of the present aspects relate to an active PDU session determining the network slice for a UE and the RRC connection (may override default network slice if any, if default network slice does not have active PDU session). It there are several PDU sessions, default/selected slice may be used for the RRC connection.

Additional primary, preferred, used, to be used, or default network slice information may be provided between elements (e.g. from the CN to RAN, from the UE to RAN, etc.) as part of the signaling messages, when signaling connection is used to carry user data or location services related information (e.g. SMS over NAS).

Additional primary, preferred, used, to be used, or default network slice information may be provided between elements (e.g. from the CN to RAN, from the UE to RAN, etc.) as part of user plane signaling (e.g. for Cellular IoT user plane based solution).

When signaling/RRC connection or PDU session is removed, if other than default network slice has been used for signaling connection (RRC connection), Cellular IoT control or user plane connection, PDU session (DRB(s)), the default network slice may be restored, when the last non-default network slice is deactivated.

Also the RAN and the CN mobility control, admission and policy control may need network slicing information for the decisions and for charging/statistics purposes. So, preferred/selected/default/used network slice information may be provided to the relevant entities.

For application and operability related purposes, slice information may be needed to select correct behavior in UE, RAN, core, application server(s) and operation and maintenance infrastructure.

The primary, preferred, used, to be used, or default network slice information may be provided over NGAP, Xn and other needed interfaces such as F1 and E1 and in core network and between core network entities.

One or more of the present aspects relate to the provision of the primary, preferred, used, to be used, or default network slice information for RRC connection signaling (e.g. between UE and core/application), user data over control-plane (e.g. SMS over NAS), location services information from the CN to the RAN, and/or from the RAN to the CN.

One or more of the present aspects relate to the provision of information that a particular network slice is not available due to network slice specific resources not being available (e.g. for RRC connection, signaling, location information, control plane based user data (such as SMS over NAS) but also for DRB, non-GBR/GBR/URLLC, IoT, MTC, etc.). This can be very temporary situation and resources may (or may not) be available shortly, which may also be indicated later from the RAN to the CN, or vice versa.

One or more of the present aspects relate to the provision of the above information from the CN (or RAN) to UE and/or vice versa.

This type of information may also be used for network sharing (i.e. for PLMN(s), and other possible groups of subscribers) such as certain kind of UEs such as URLLC, IoT, MTC, or network elements, accesses and systems such as satellite, WiFi, etc.

One or more of the present aspects may assume that the primary, preferred, used, to be used, or default network slice is used and is indicated between the UE, the CN and the RAN.

Priority order for the allowed, primary, preferred, used, to be used, or default network slices may be provided. In this case, the highest order network slice may typically be the default network slice and, if used, may be omitted from messages from the UE to the CN. In this case, the CN may still need to be provide the information to the RAN when the RAN does not have the UE context with the priorities (e.g. at signaling connection (RRC and NGAP) establishment).

Figure 5:
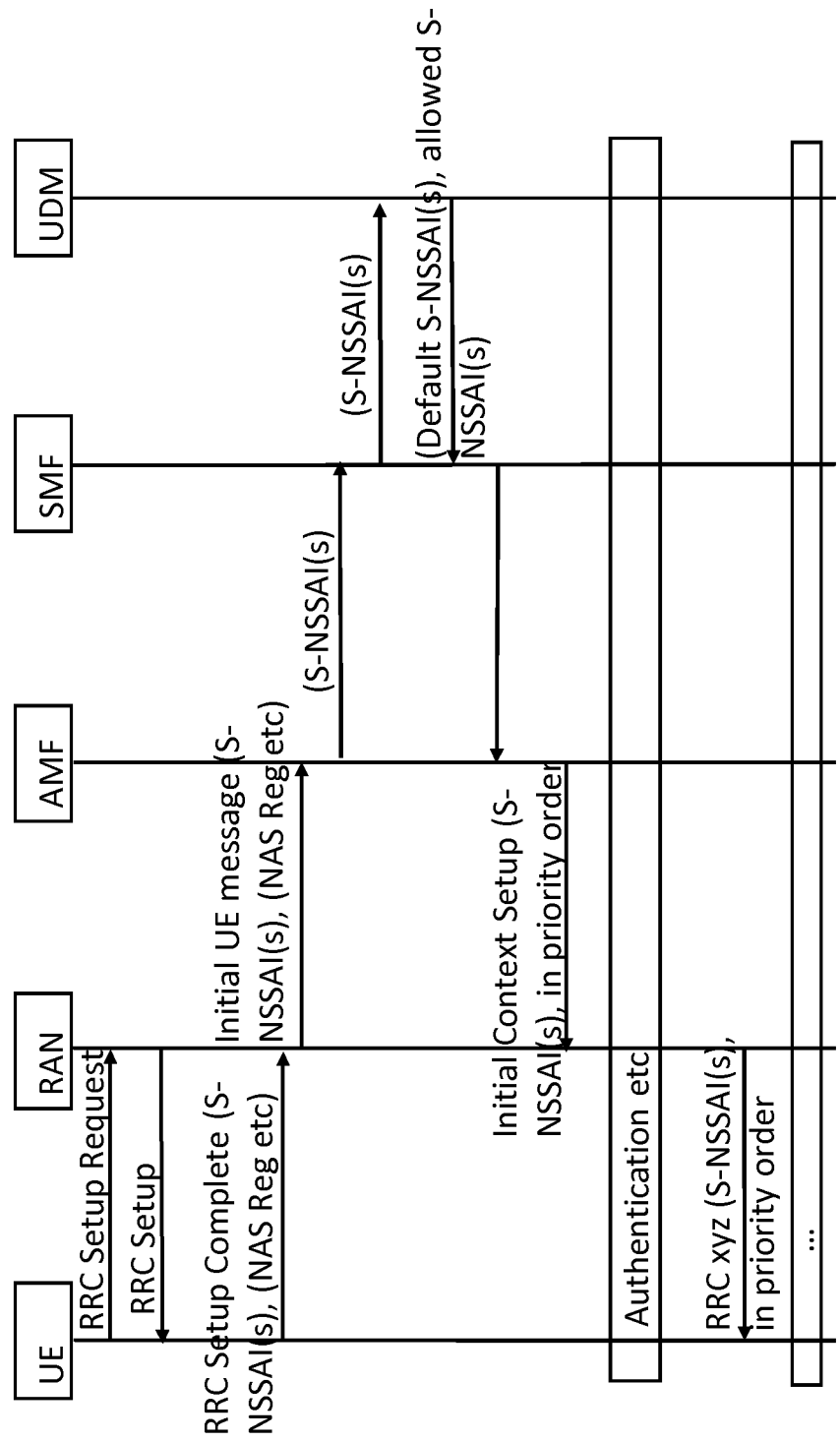
FIG. 5 shows a signaling diagram of a method for performing user registration and radio resource control connection establishment with network slice selection.

FIG. 5 shows a signaling diagram of a method for user registration and RRC connection establishment with network slice selection. The primary, preferred, used, to be used, or default network slice may be omitted from some messages.

The UE may provide the primary, preferred, used, to be used, or default network slice to the RAN in NAS Message and/or RRC Setup Complete. The RAN may provide the primary, preferred, used, to be used, or default to the CN in an Initial UE message.

The CN may provide a confirmed default network slice in downlink messages. The confirmed default network slice may be different from the proposed default network slice.

The CN may provide the proposed default network slice and the confirmed default network slice in downlink messages. Especially if the CN has changed the UE proposed default network slice, the confirmed network slice may be provided.

The CN (e.g. the UDM) may determine what are the UE's prioritized allowed network slices based on priority information and may provide the confirmed default network slice. There may be priority information in different parts of the CN (e.g. UDM and other parts).

Figure 6:
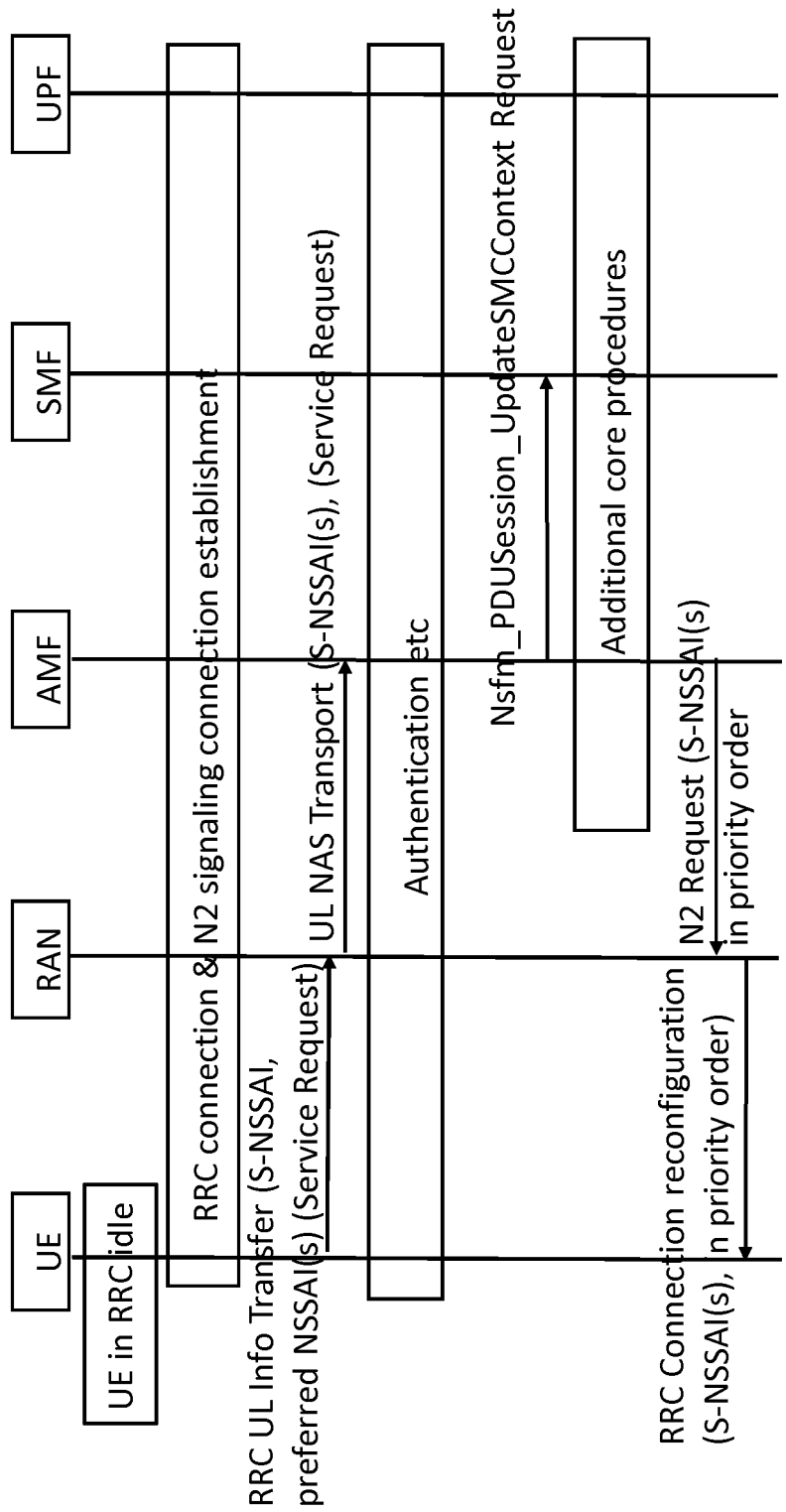
FIG. 6 shows a signaling diagram of a method for providing network slice information for control plane signalling.

FIG. 6 shows a signaling diagram of a method for providing network slice information for C-plane signalling. The primary, preferred, used, to be used, or default network slice may be omitted from some messages.

The UE may provide the primary, preferred, used, to be used, or default network slice to the RAN in NAS Message and/or RRC Setup Complete. The RAN may provide the primary, preferred, used, to be used, or default network slice to the CN in an Initial UE message.

The CN may provide a confirmed default network slice in downlink messages. The confirmed default network slice may be different from the proposed default network slice.

The CN may provide the proposed default network slice and the confirmed default network slice in downlink messages. Especially if the CN has changed the UE proposed default network slice, the confirmed network slice may be provided.

The CN (e.g. the UDM) may determine what are the UE's prioritized allowed network slices based on priority information and may provide the confirmed default network slice. There may be priority information in different parts of the CN (e.g. UDM and other parts).

Figure 7:
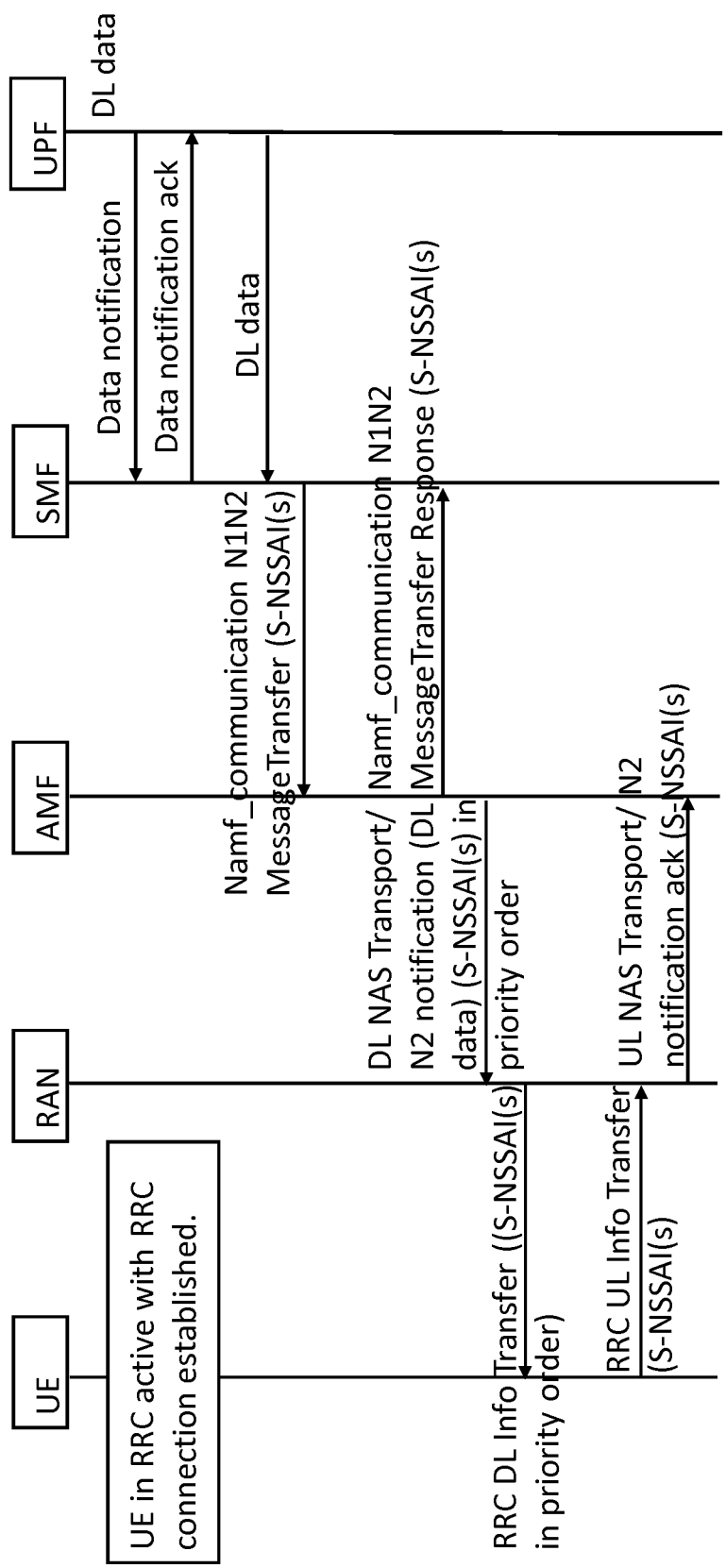
FIG. 7 shows a signaling diagram of a method for providing network slice information for control plane signalling.

FIG. 7 shows a signaling diagram of a method for providing network slice information for C-plane signalling (e.g. SMS over NAS).

If the UE is in RRC idle or RRC inactive, in case of downlink data/message triggering the procedure, additional procedures may be needed to page the UE (in which case the default/selected/preferred slice may be included in the downlink messages/user packets (e.g. by the CN to RAN, possibly to UE) and establish the (full) RRC connection, NGAP context).

Figure 8:
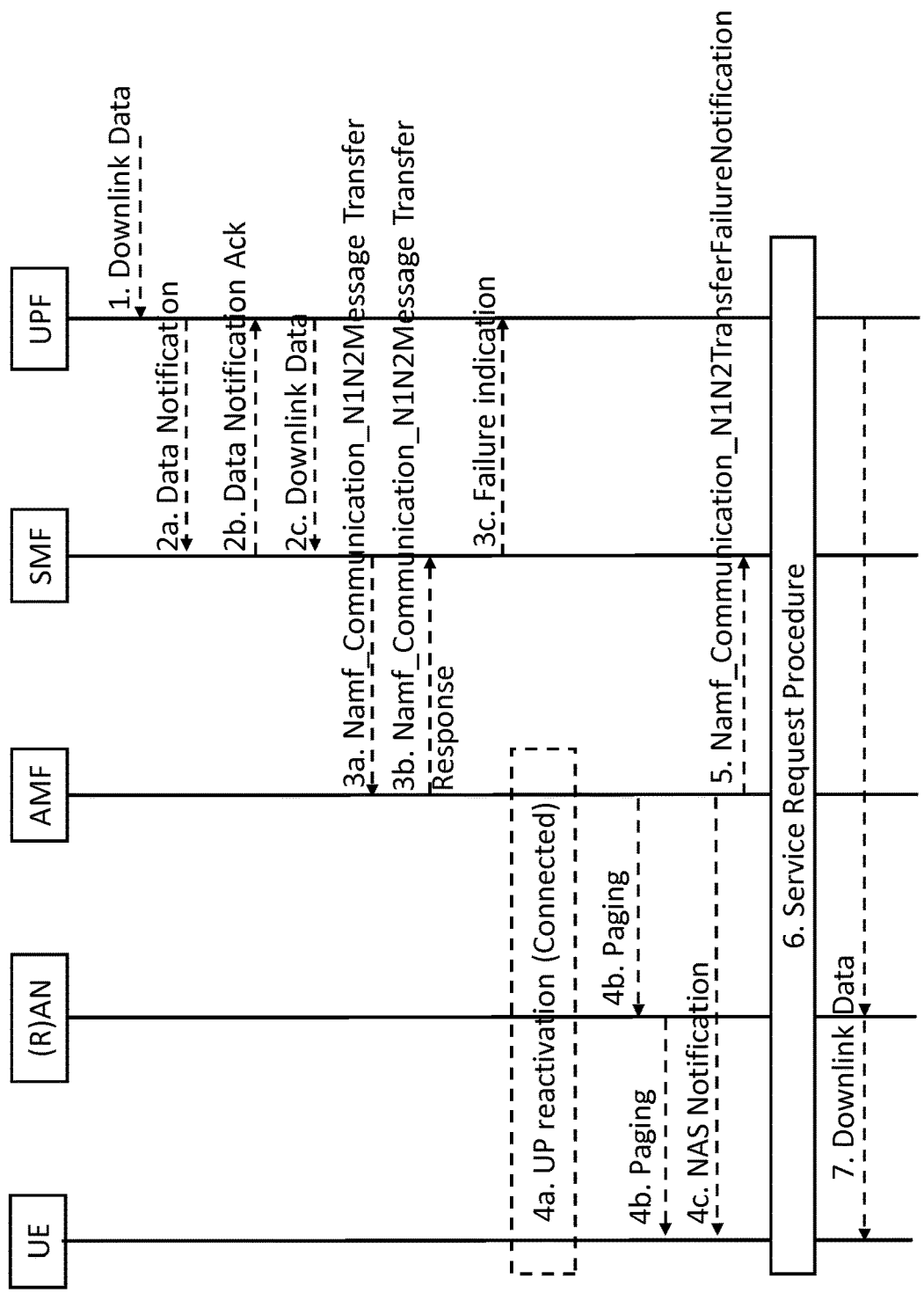
FIG. 8 shows a signaling diagram of a method for paging a user equipment.

FIG. 8 shows a signaling diagram of a method for paging a UE.

Primary, preferred, used, to be used, or default network slice information may be given at least from the CN to the RAN. With RRC inactive and RAN initiated paging, if default network slice is used, the network slice may be omitted in downlink message/user packet. Selected/preferred network slice may be included, at least if different from the primary, preferred, used, to be used, or default network slice for the RRC connection.

Figure 9:
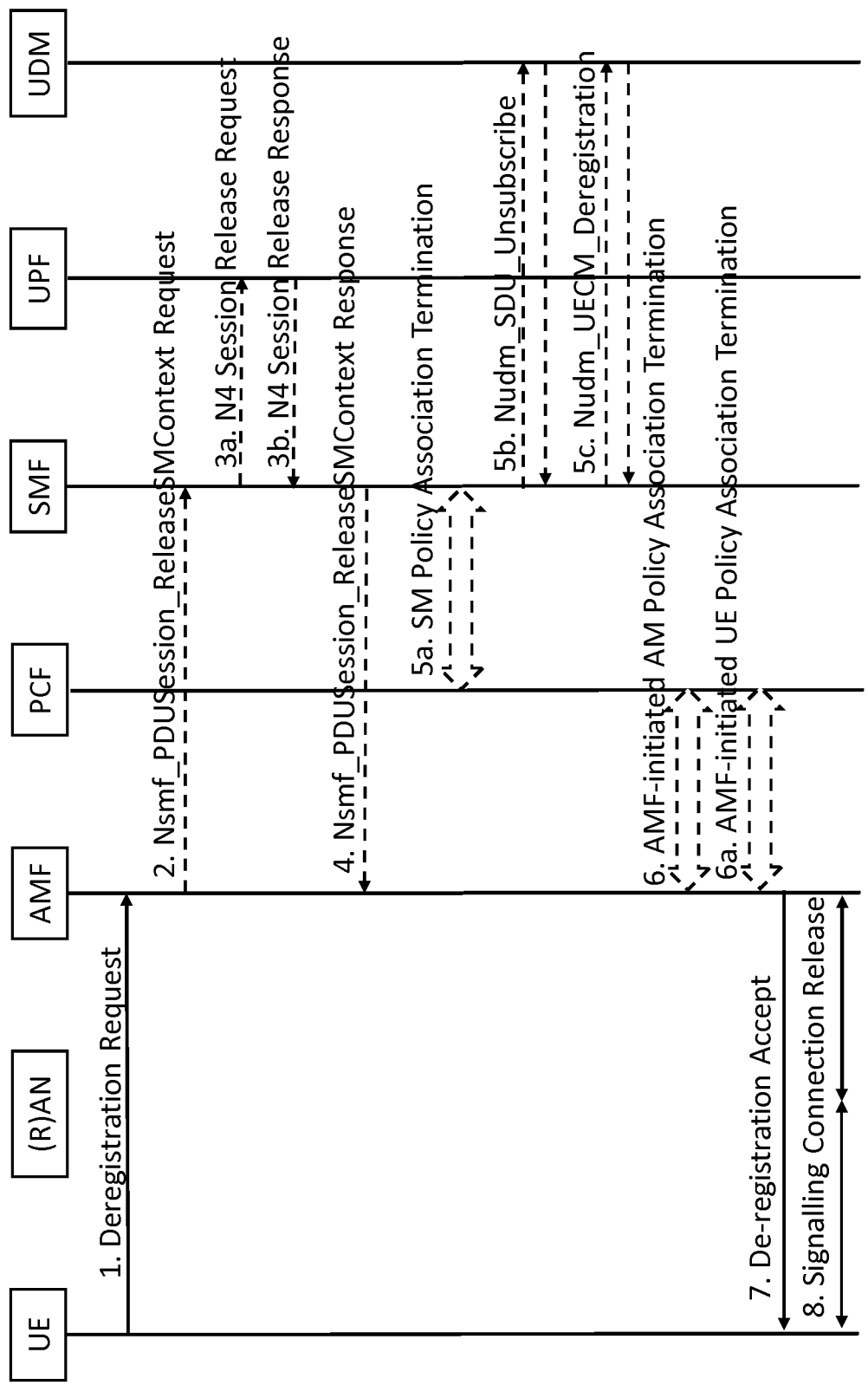
FIG. 9 shows a signaling diagram of a method for performing user equipment de-w registration and associated radio resource control connection and/or new generation application protocol connection removal.

FIG. 9 shows a signaling diagram of a method for UE de-registration and associated RRC connection (and/or NGAP connection) removal.

The RAN (and/or the UE) may indicate the preferred network slice(s) associated with the RRC connection (signaling connection) to the CN. The CN may also indicate t the preferred network slice(s) associated with the RRC connection (signaling connection) to the RAN over NGAP with this procedure and/or core network initiated UE deregistration procedure.

Figure 10:
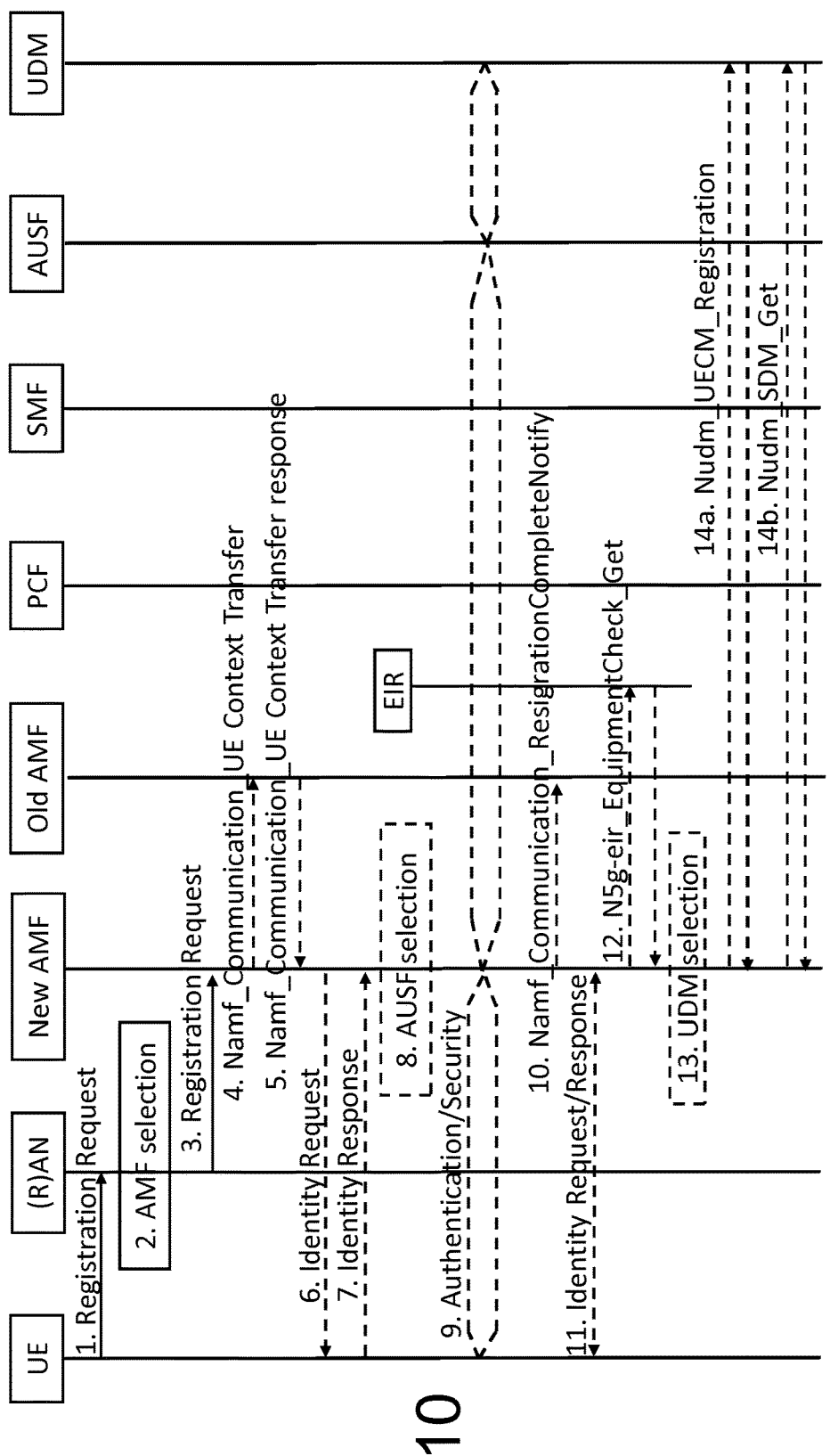
FIGS. 10 and 11 show a signaling diagram of a method for performing user equipment registration and associated radio resource control connection and/or new generation application protocol connection setup.
Figure 11:
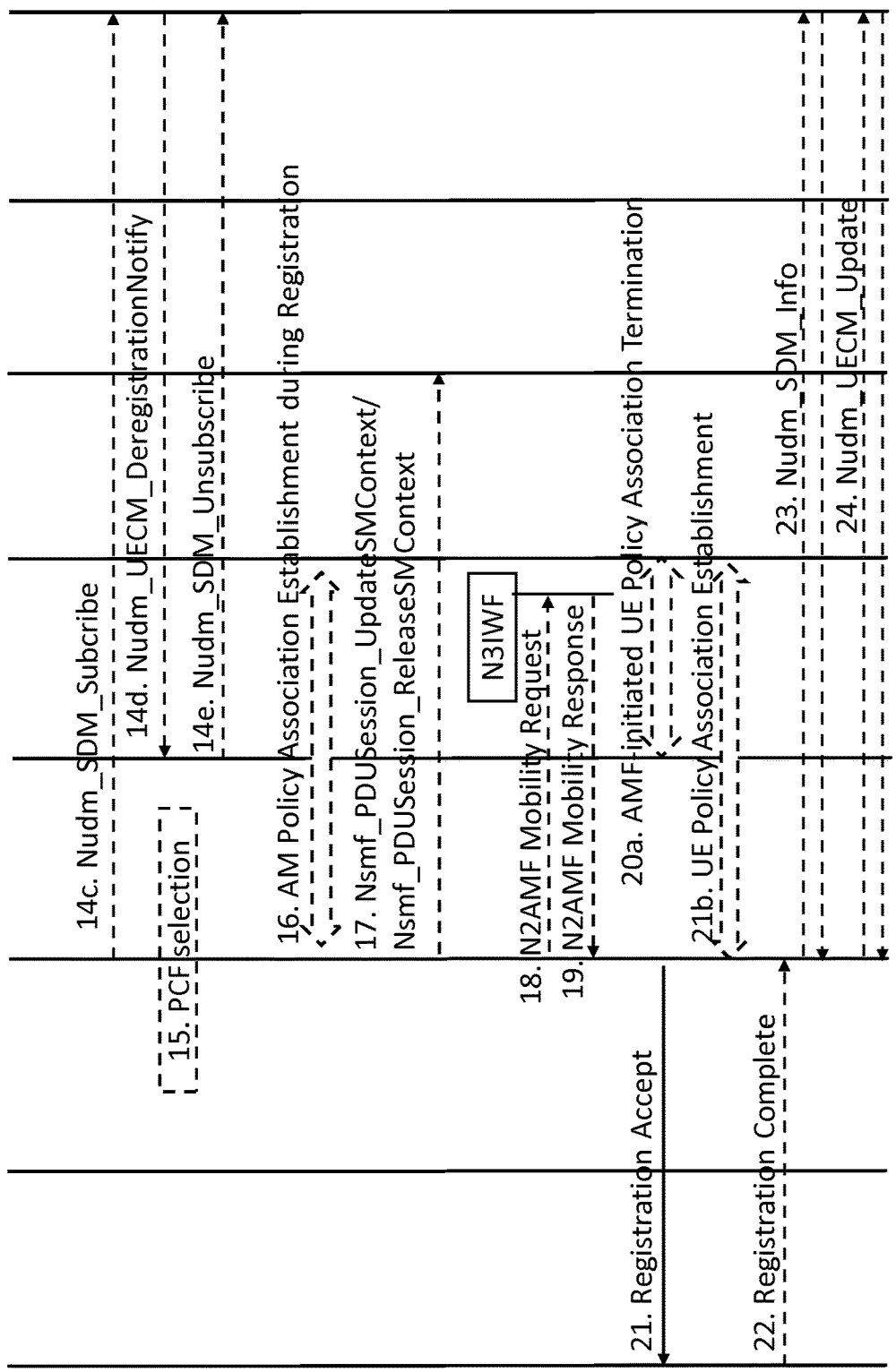

FIGS. 10 and 11 shows a signaling diagram of a method for UE Registration and associated RRC connection (and/or NGAP connection) setup.

The information about the preferred (prioritized, used, to be used, etc.) slice for RRC connection is provided with NGAP Initial context setup request associated with step 21. The RAN may acknowledge the information in the response message (e.g. NGAP Initial context setup response).

Figure 12:
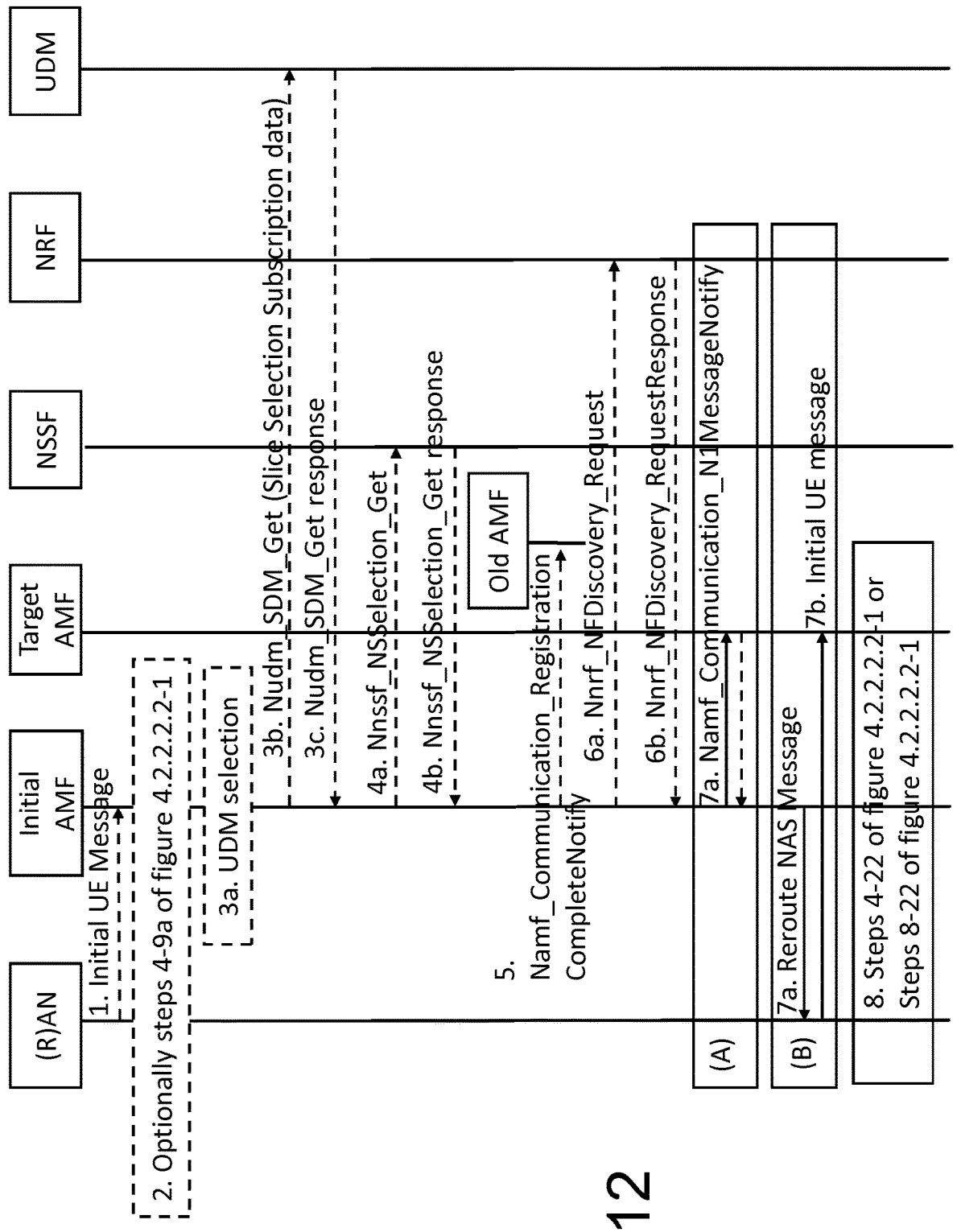
FIG. 12 shows a signaling diagram of a method for performing user equipment registration and associated radio resource control connection and/or new generation application protocol connection setup with access management function re-allocation.

FIG. 12 shows a signaling diagram of a method for UE Registration and associated RRC connection (and/or NGAP connection) setup with AMF re-allocation.

The AMF may be re-allocated due to missing resources in the CN (e.g. at AMF, SMF, RAN, etc.).

This may be indicated by error indication with "Reroute NAS message" from CN to RAN. Lacking RAN resources for the network slice(s) could also be indicated from the RAN to the CN based on UE provided network slices (e.g. in NGAP Initial UE message).

Figure 13:
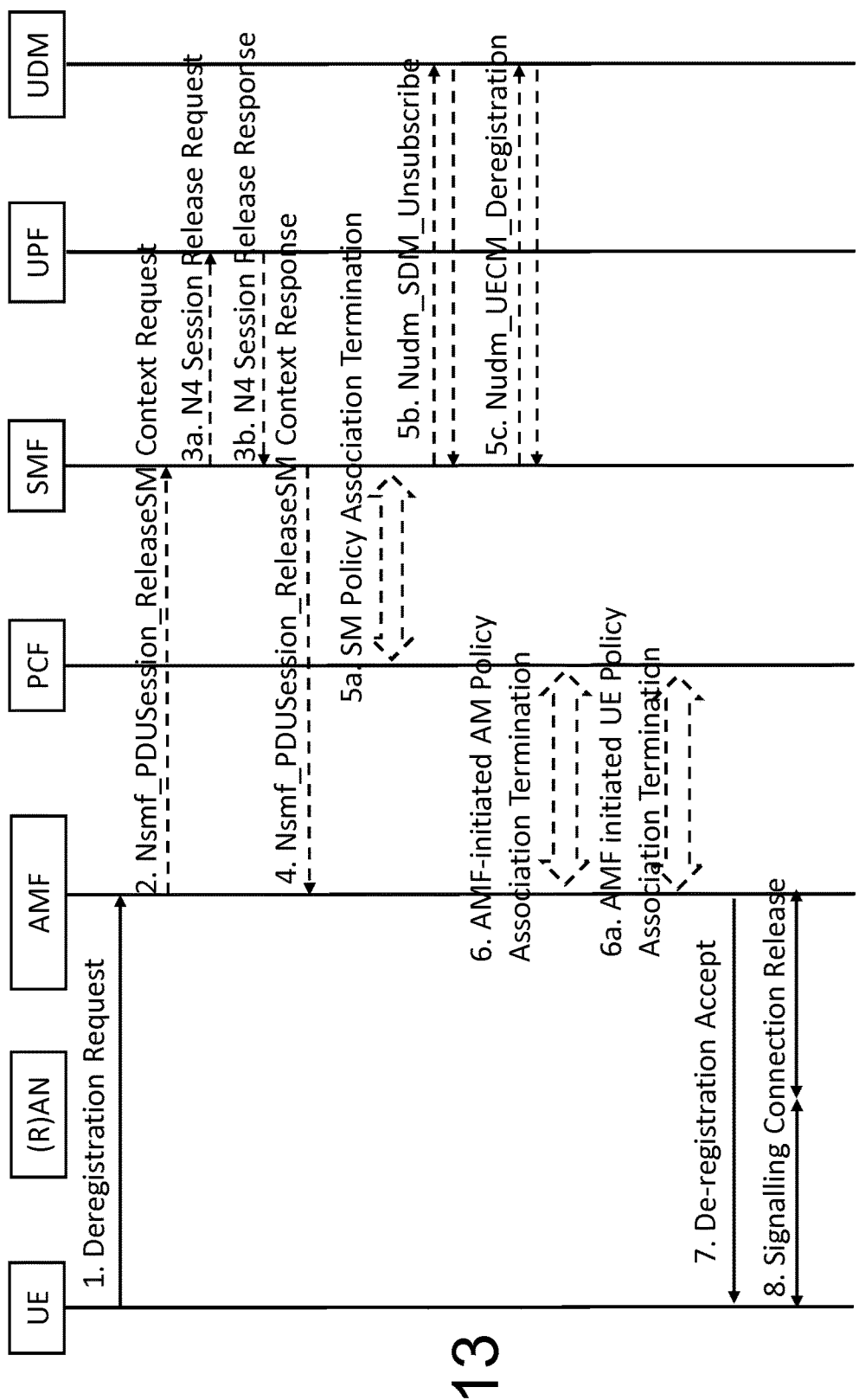
FIG. 13 shows a signaling diagram of a method for performing user equipment de-registration and associated radio resource control connection and/or new generation application protocol connection removal.

FIG. 13 shows a signaling diagram of a method for UE De-registration and associated RRC connection (and/or NGAP connection) removal.

The RAN (and/or the UE) may indicate the preferred, prioritized, used or to be used, network slice(s) associated with the RRC connection (signaling connection) to the CN. The CN may also indicate them to the RAN over NGAP with this procedure and/or the CN initiated UE deregistration procedure.

Figure 14:
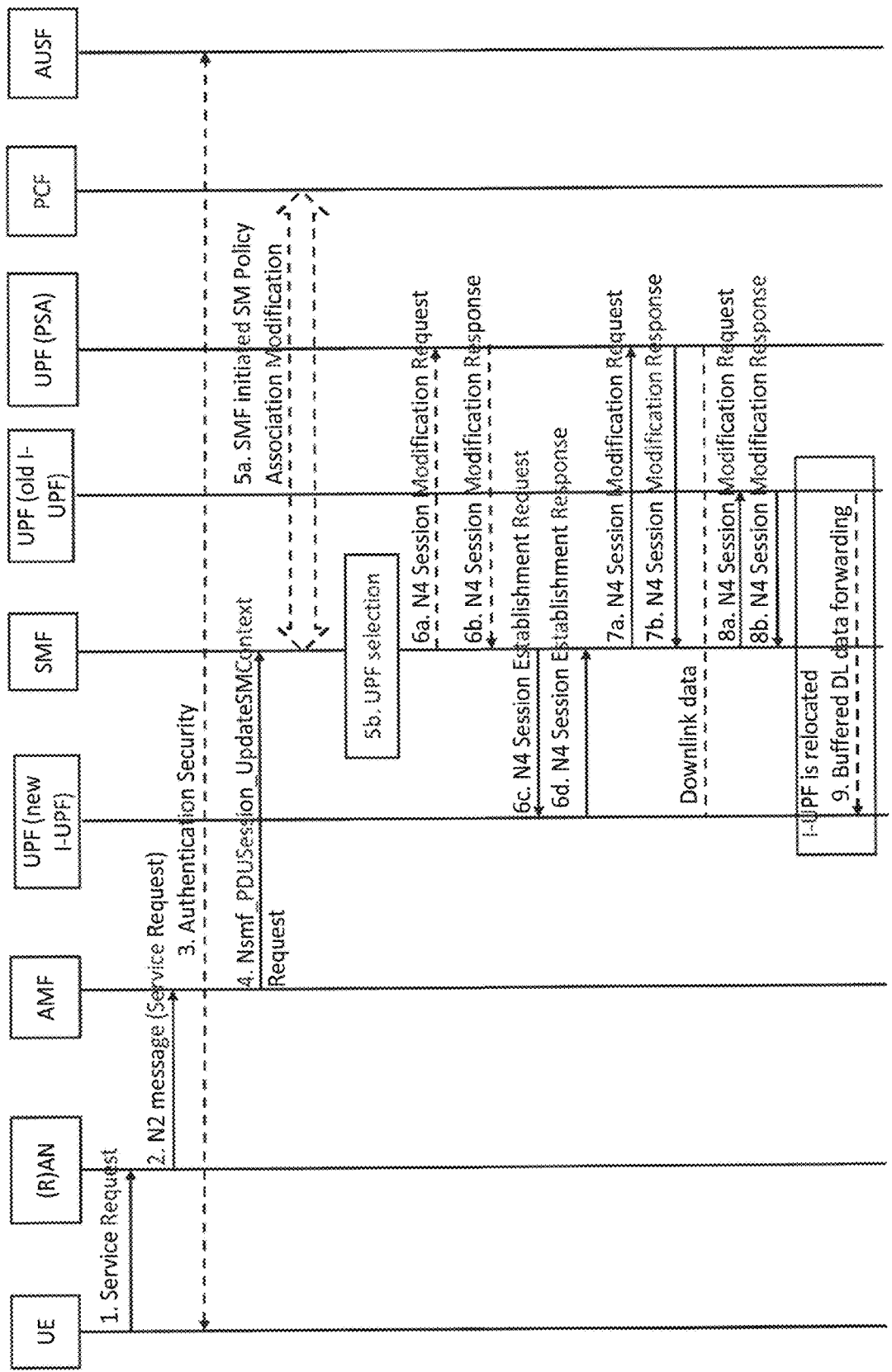
FIGS. 14, 15 and 15a show a signaling diagram of a method for performing user equipment initiated service request procedure and associated radio resource control connection and/or new generation application protocol connection setup and packet data unit session setup.
Figure 15:
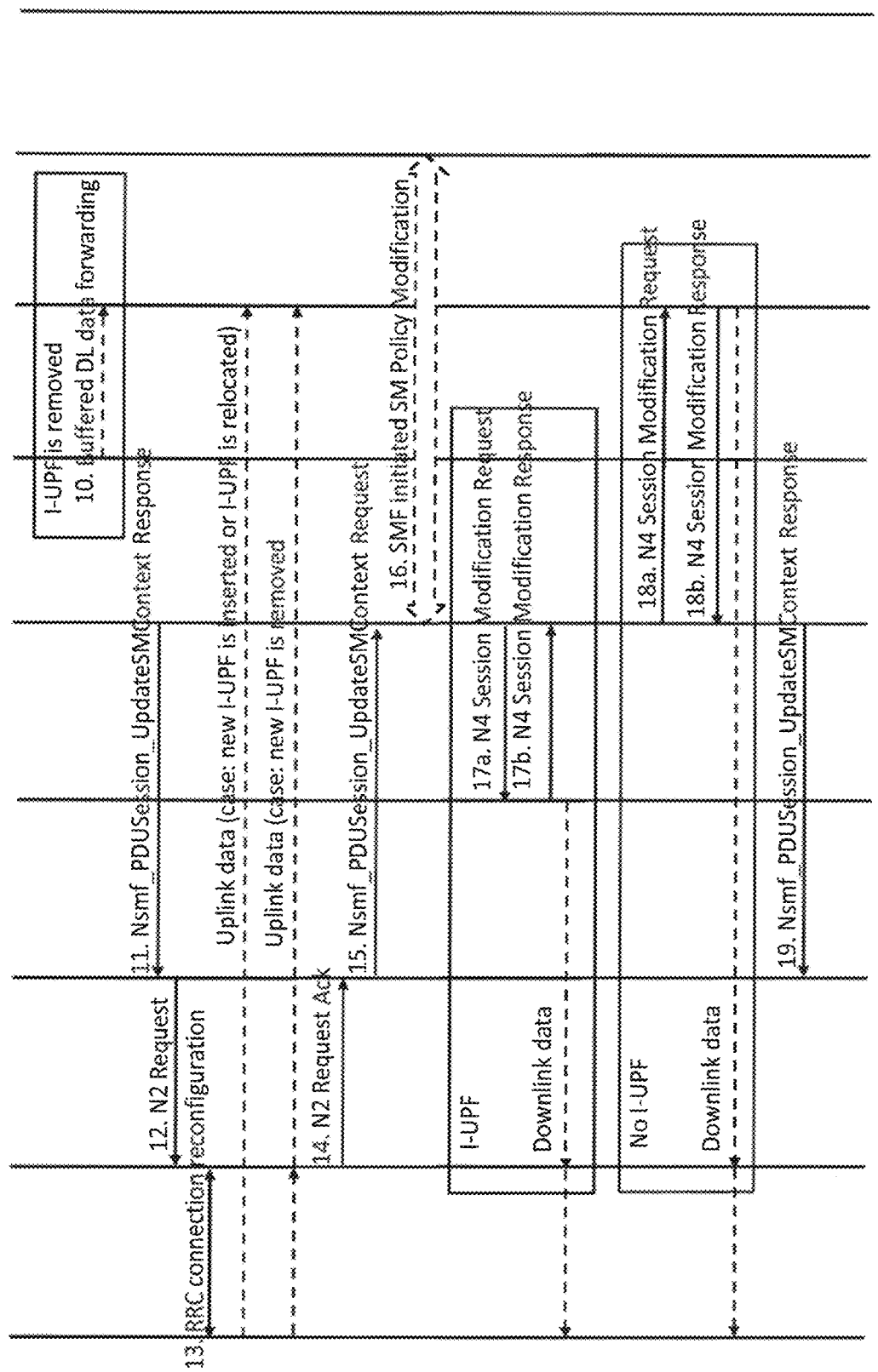
Figure 15A:
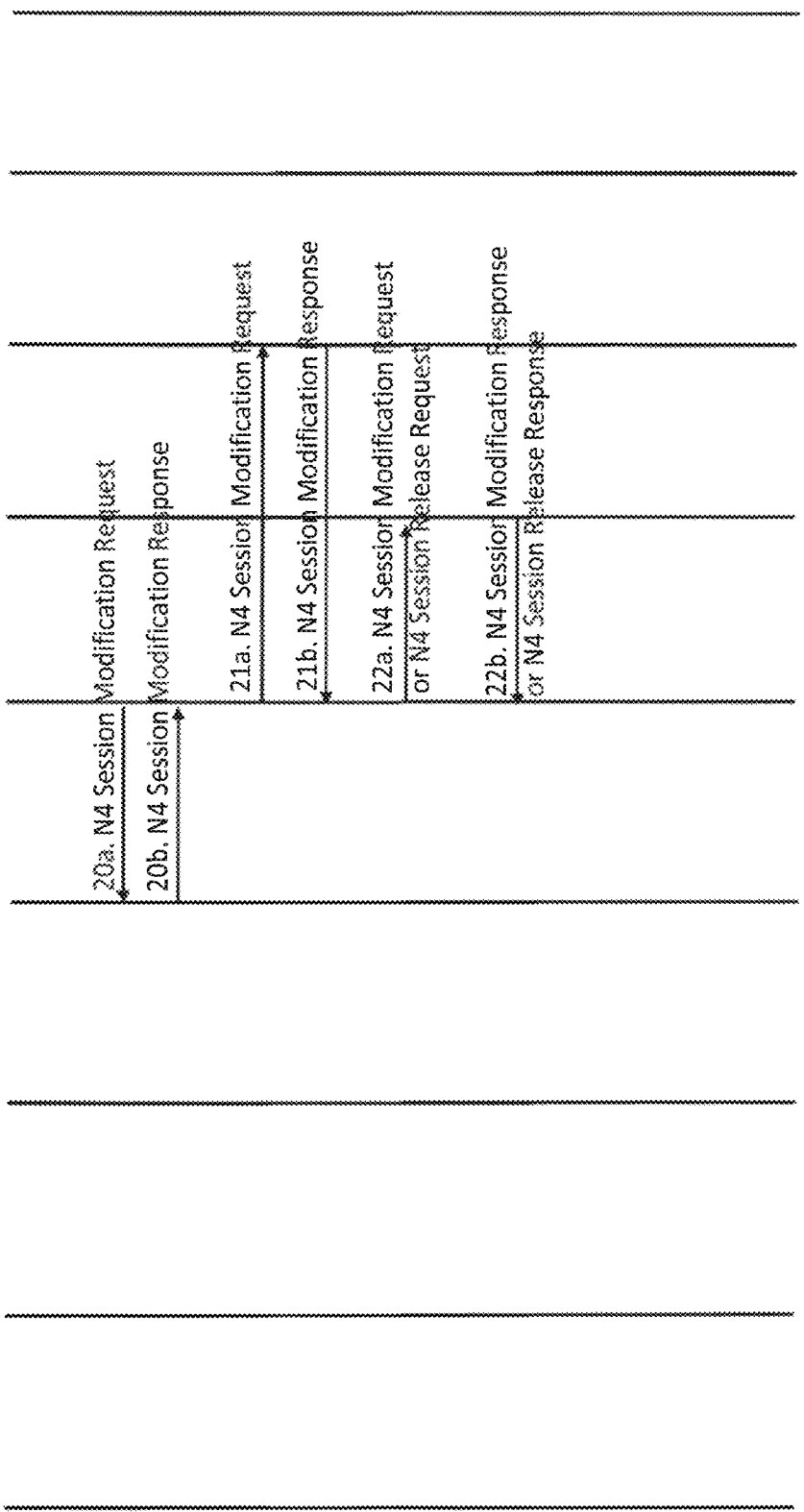

FIGS. 14, 15 and 15a show a signaling diagram of a method for UE Initiated Service request procedure and associated RRC connection (and/or NGAP connection) setup and PDU session setup.

In the UE initiated service request, the UE may indicate the preferred, prioritized, used, or to be used network slice to the RAN (and the CN). The RAN may further indicate the preferred, prioritized, used, or to be used network slice to the CN with resource availability.

The CN may also indicate the preferred, prioritized, used, or to be used network slice to the RAN in Initial context setup. The RAN may provide an acknowledgement (and/or non-acknowledgement) in Initial context setup response or in rejection message in case of resources not available for the preferred, prioritized, used, or to be used network slice.

Figure 16:
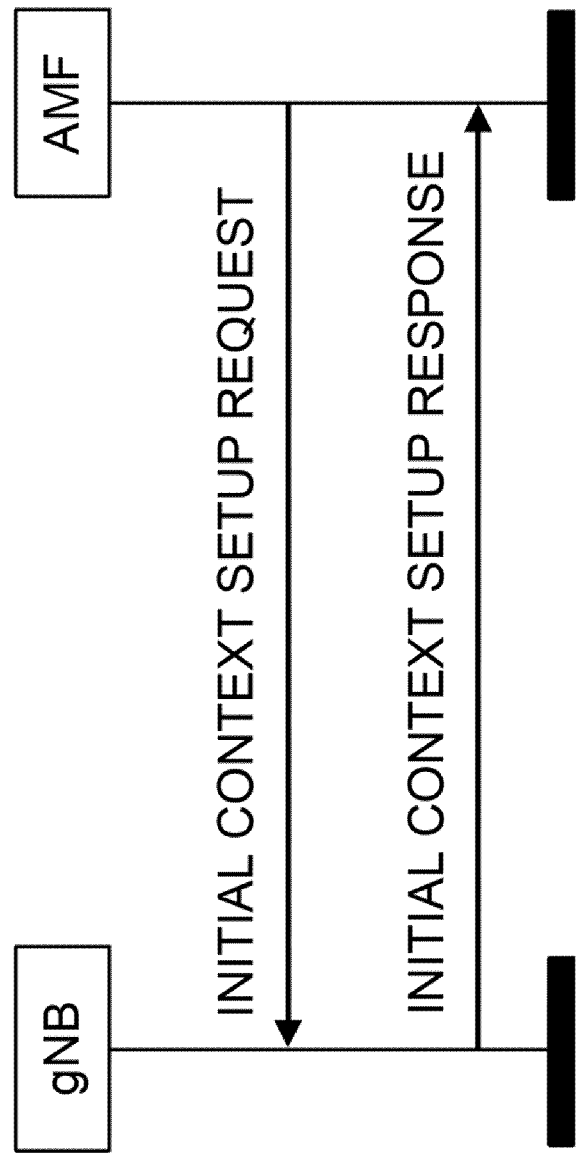
FIG. 16 shows a signaling diagram of a method for performing Initial context setup procedure over new generation application protocol.

FIG. 16 shows a signaling diagram of a method for Initial context setup procedure over NGAP.

Initial context setup request may contain explicit or implicit indication on the preferred (prioritized, used, to be used, etc.) slice. Typically there may be one preferred slice but could be several. Explicit indication would be a bit indicating the "preferred status". The information can be omitted from non-preferred slices or this can be indicated explicitly. Implicit indication can also be the first slice in the initial context setup request.

Initial context setup response may contain ack (or nack) for the preferred slice indicating whether RRC (and NGAP) connection resources are available as well as on resources for bearers (i.e. PDU session(s) and their DRB(s)), if those were requested. The ack and/or nack for the resources may be indicated explicitly with specific error code such as "no slice resources for RRC connection, user, DRB, NGAP, signaling connection, or with general positive or negative code such as "success", "failure", "resources not available", "service not available", "service not temporarily available".

Figure 17:
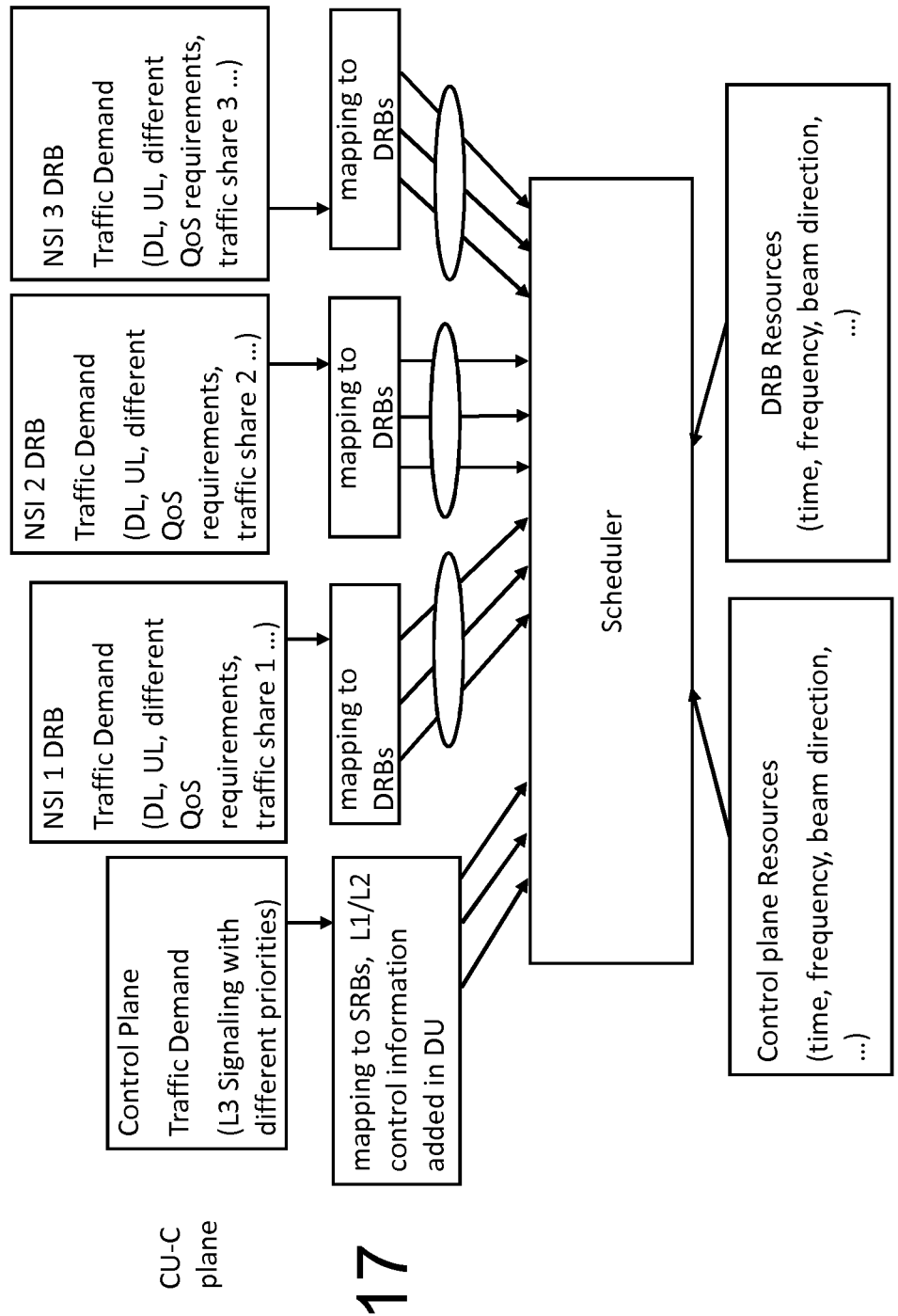
FIG. 17 shows a schematic diagram illustrating the principle of control plane based virtual quota supervision 5G radio access network.

FIG. 17 shows a schematic diagram illustrating the principle of control plane based virtual quota supervision 5G RAN. Multiple parameters may be supervised per slice/group of slices including: number of submitted users (RRC connections); number of bearers (DRBs) —GBR and non-GBR separately; and/or Bearer bit rate (Non-GBR: session AMBR and nominal bit rate based; GBR: QoS flow bit rate).

Figure 18:
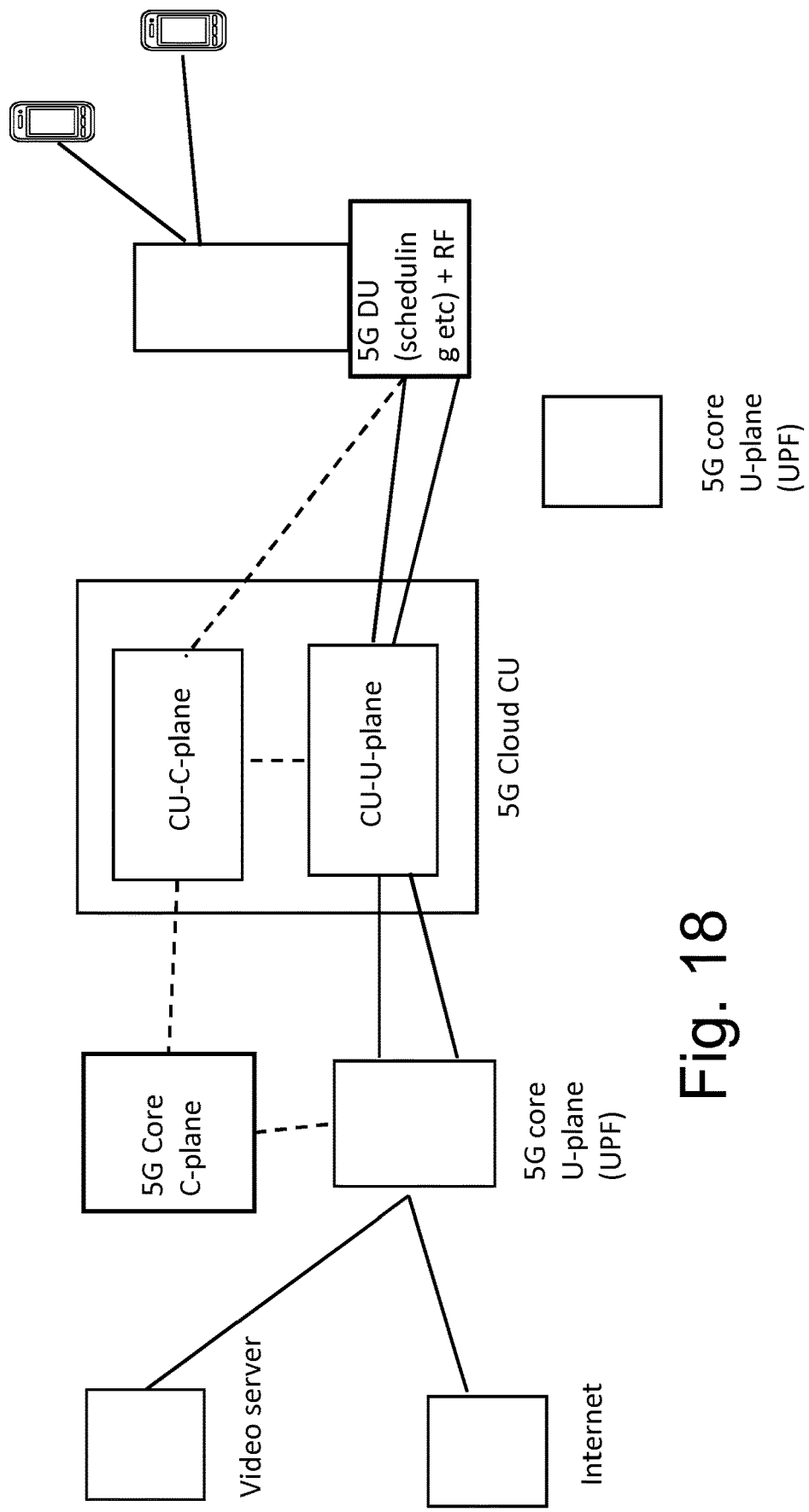
FIG. 18 shows another schematic diagram illustrating the principle of control plane based virtual quota supervision 5G radio access network.

FIG. 18 shows another schematic diagram illustrating the principle of control plane based virtual quota supervision 5G RAN.

Virtual resource pools may be used in central unit control plane (CU-CP), central unit user plane (CU-UP) and distributed unit.

DU may supervise the nominal bit rate per non-GBR bearer, as per our nominal bit rate feature.

CU-CP may supervise the slice specific minimum and maximum quota use, and associated margin quotas, if used: when admitting a new user to the system at power on, with location update, at incoming handover; and/or when admitting a new bearer at bearer setup, at bearer modification and with incoming handover.

Some further examples are described with respect to the signalling diagrams of FIGS. 19 to 22.

Figure 19:
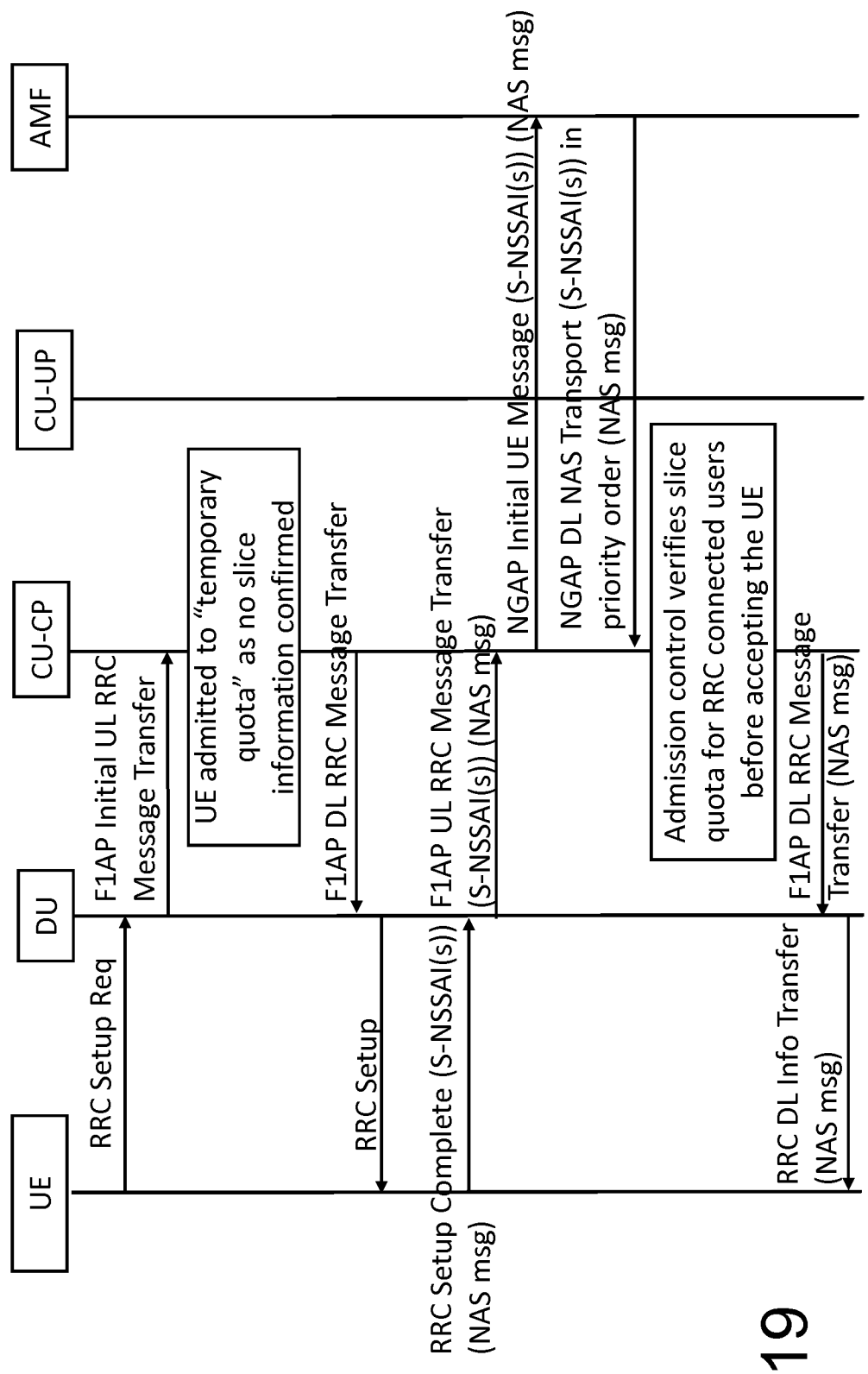
FIG. 19 shows a signaling diagram according to an example.

With respect to FIG. 19 which shows an example RRC connection setup w/o DRB, in some examples the S-NSSAI admission control can be run only for those procedures for which initial context set-up procedures is used, i.e. "UE context request" is set to "requested" in Initial UE message. This means that for NAS location updates (Service request, RRC establishment cause "no-signalling") could be allowed as the procedure is short and most of it is already carried out at this point. Note that in the message from the AMF to the CU-UP, the S-NSSAI(s) are in priority order. Subsequently, at the CU-UP the admission control verifies slice quota for RRC connected users before accepting the UE.

Figure 20:
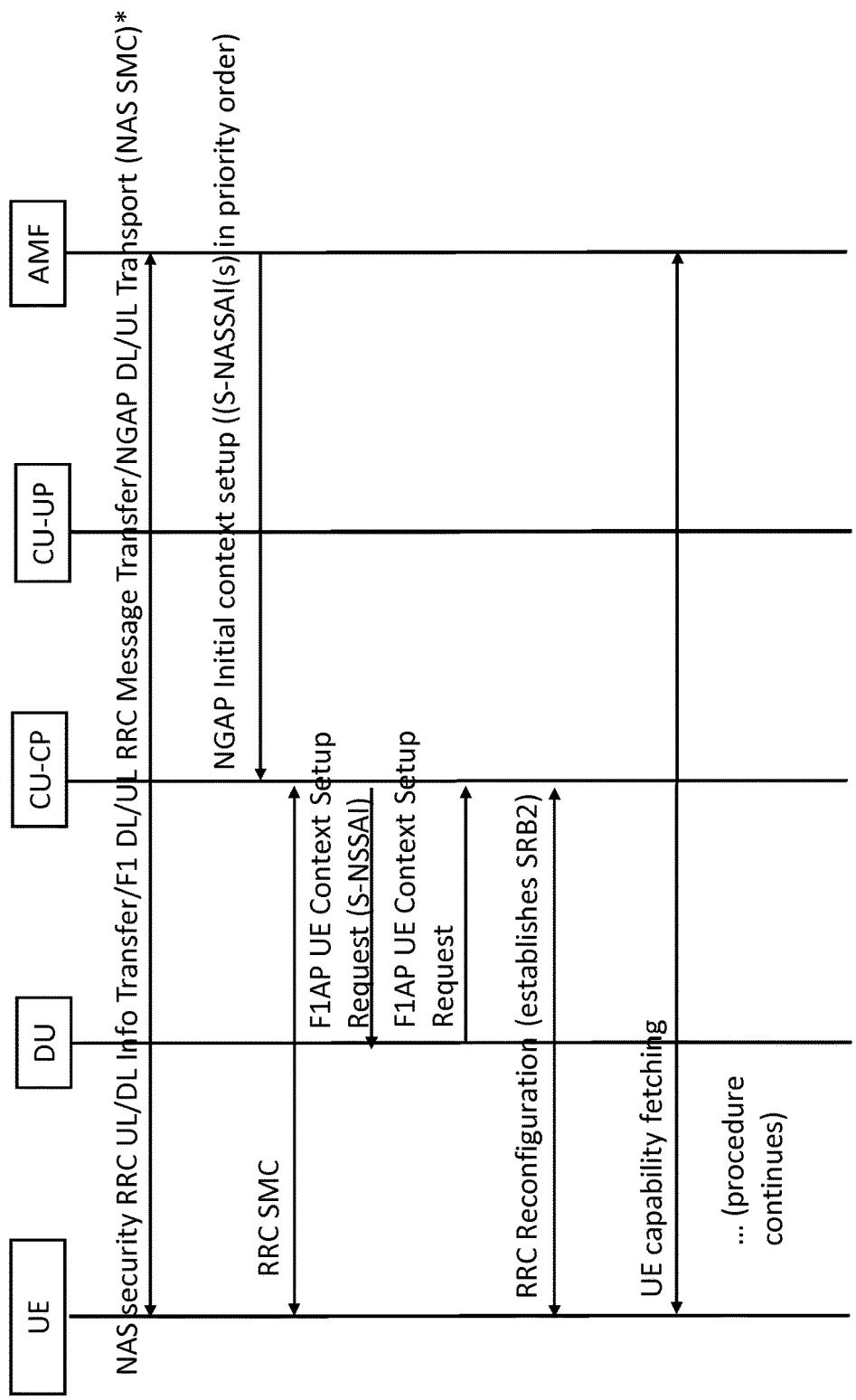
FIG. 20 shows a signaling diagram according to an example.

With respect to FIG. 20, this shows an example RRC connection setup without DRB. In the initial messaging between UE and AMF, there could also be additional NAS procedures such as an IMEI check etc. It will be noted that in the message from the AMF to the CU-CP, in the NGAP initial context setup the S-NSSAIs are in priority order.

Figure 21:
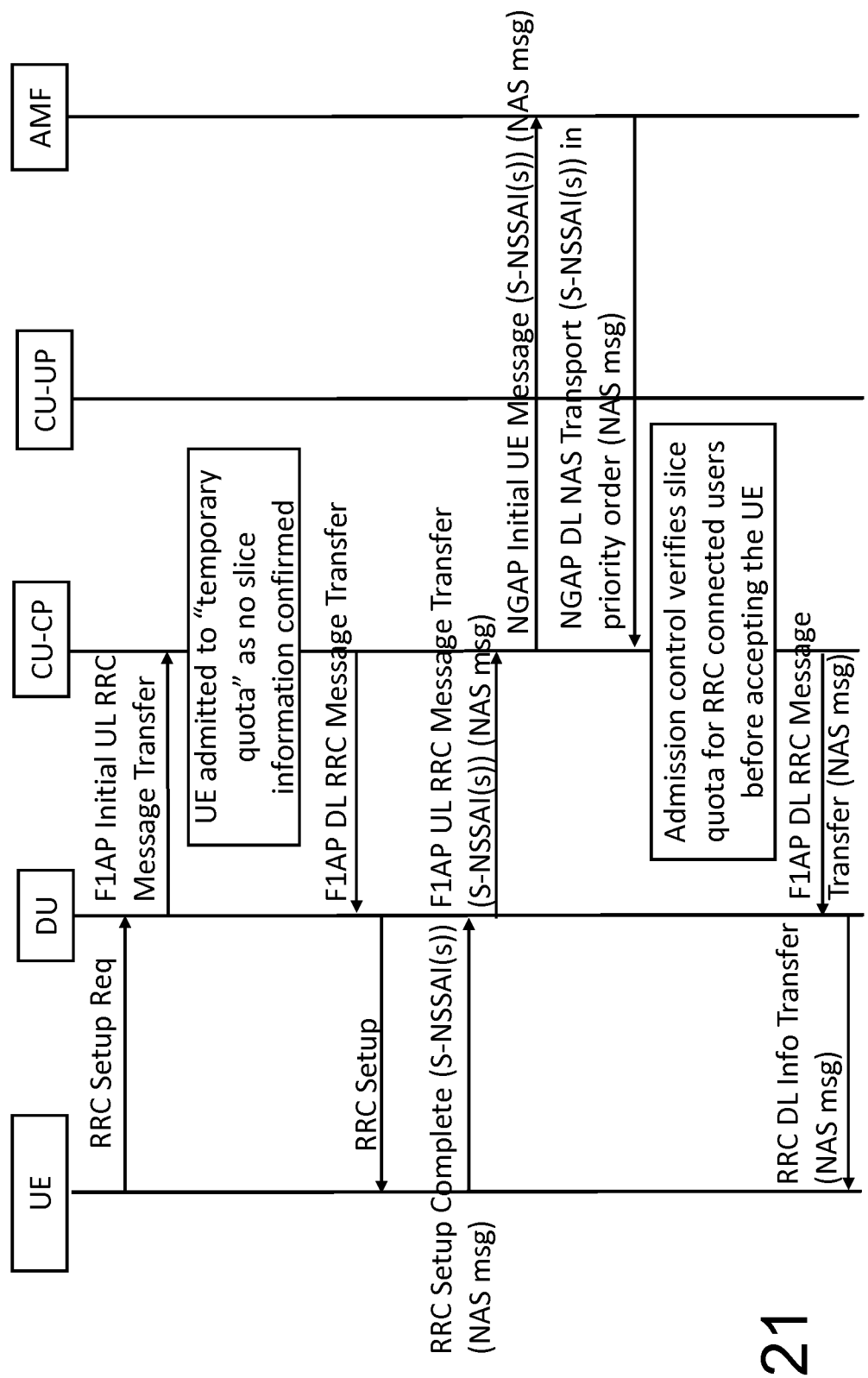
FIG. 21 shows a signaling diagram according to an example.

With respect to FIG. 21, this shows an example RRC connection and DRB (PDU session) setup, with RRC connection setup and first NAS messages. In this example the S-NSSAI admission control can be run only for those procedures for which Initial context setup procedures is used, i.e. "UE context request" is set to "requested" in Initial UE message. This means that for NAS location updates (Service request, RRC establishment cause "no-signaling") could be allowed as the procedure is short and most of it is already carried out at this point. Note that in the message from the CU-CP to the AMF the S-NSSAI(s) are in priority order. Note that in the message from the AMF to the CU-UP, the S-NSSAI(s) are in priority order. Subsequently, at the CU-UP the admission control verifies slice quota for RRC connected users before accepting the UE.

Figure 22:
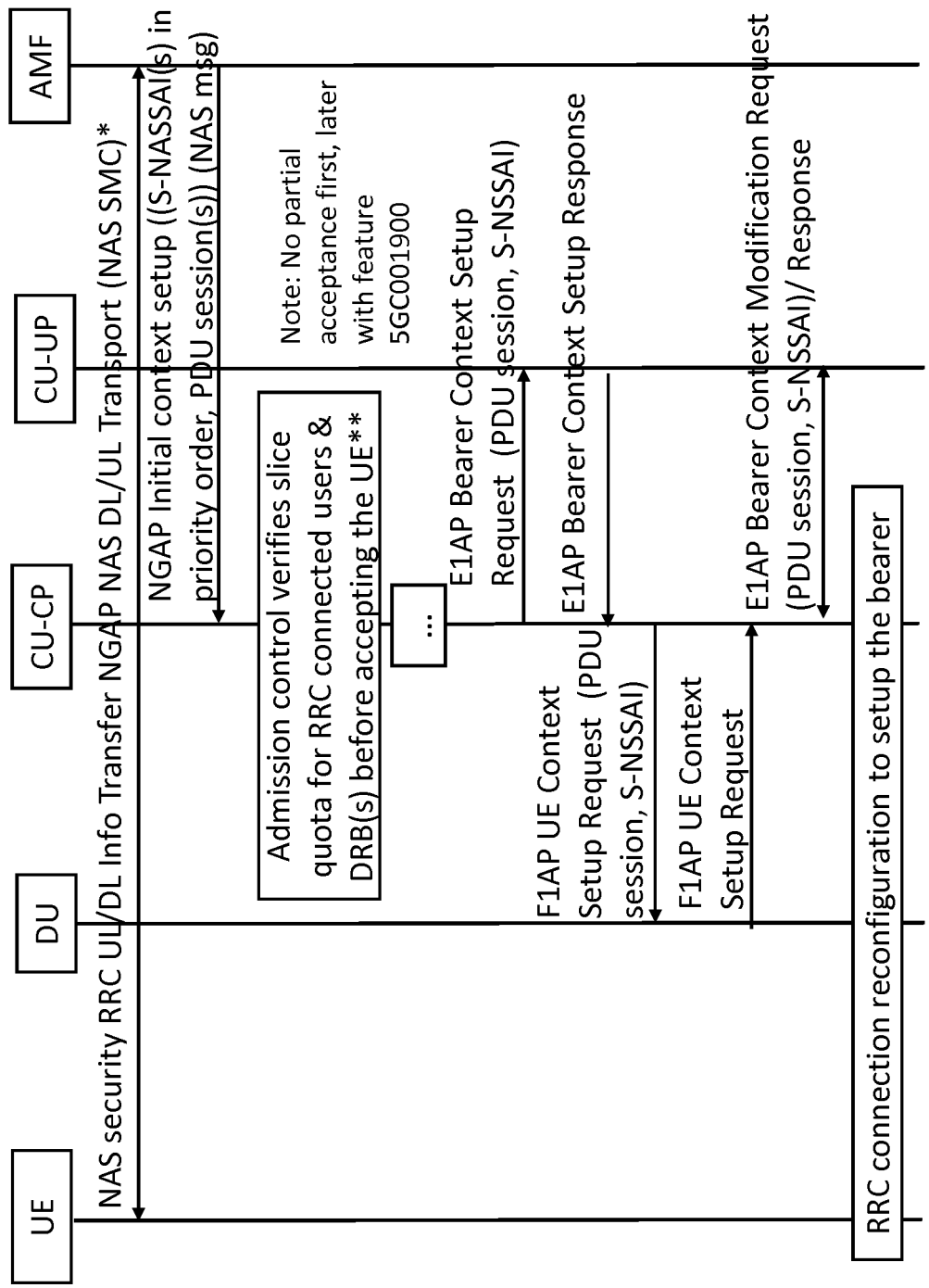
FIG. 22 shows a signaling diagram according to an example.

With respect to FIG. 22, this shows an example RRC connection and DRB (PDU session) setup DRB/PDU session setup signalling. The initial communication between UE and AMF could also include additional NAS procedures such as IMEI check etc. Several PDU sessions may be active with different slices. The PDU session setup with NGAP PDU session resource request is handled from NW slicing quota point of view as Initial context setup with PDU session establishment request. Note that in the message from the AMF to the CU-UP, the S-NSSAI(s) are in priority order. Subsequently, at the CU-UP the admission control verifies slice quota for RRC connected users before accepting the UE.

One or more of the present aspects may be applicable for communications systems, for example for mobile networks such as 5G or LTE connected to 5G core, where mobile devices communicate over air interface with the mobile network infrastructure to provide communication means for users. Mobile users may move in and out of a particular cell or network, move around within one or multiple cells, frequencies, radio technologies and networks. Some or all of the networks may be fixed (non-mobile) and communication between user device and the communication infrastructure may also be via fixed link such as line cable. The network users may be entitled and/or willing to use different applications and services, this may be due to subscription, device capability, current congestion level in the system and this results in different radio and other resource allocations for the UEs.

Currently with 3GPP Rel-15 specifications the CN may indicate UE's Allowed network slices per Registration area to the UE and the RAN when the UE registers to the system. Likewise, the CN may indicate the Network slice associated with a PDU session when the PDU session is established. However, there is no default or selected network slice information or prioritization information among UE's allowed slices to be used for signalling (e.g. only) connections (e.g. RRC, NGAP, etc.).

UE's signalling (e.g. only) connection may be used for location updates, UE management messages (e.g. provision information from CN to UE), user plane delivery included in NAS messages (e.g. SMS over NAS), location services related signalling, cellular IoT control and possibly user plane solution in RAN or other.

Consequently, with the 3GPP Rel-15 based solution, the RAN and/or the CN may not have the information as to which network slice the signalling connection belongs to especially if the UE has more than one allowed network slice. Thus, the admission control, charging, etc. in the RAN and/or the CN may not take the network slice information into account. However, the RAN and/or the CN may need the applicable network slice information for admission control, mobility control, policy control, statistics/charging, etc. For example, the RAN may limit the number of RRC connections per network slice in the cell/sector, frequency, etc.

Especially in the RAN, the resources are scarce and the number of users in cell/sector is limited. If there is no S-NSSAI for the RRC connection, users may be accepted on first come, first served basis and during rush hour this may mean that one or two slices populate a cell and others may not access the cell as the maximum number of users may be consumed. This may easily mean that some other slice users will be rejected even if operator has agreed to provide them certain access.

Furthermore, there may be a limit to the maximum number of bearer connections (PDU sessions and DRBs) these users can have. With this, the end result is that there may be accepted users which cannot establish user sessions as the maximum number of user sessions allowed for the slice is reached, and the other slice users which have the right to establish user sessions cannot establish RRC connection (which is required to establish the user session) as the maximum number of RRC connections is consumed by such slice users for which there are no more bearer sessions available. Thus, there may be RRC connected users which do not have right to establish bearer sessions and those who have still right to establish bearers may not get RRC connections. This would be mean that operator may not meet the service level agreement they have intended for various user groups and also the radio resources are underused.

In addition, with 3GPP Rel-16 Control plane (signaling) based cellular IoT only has signaling connection and without this solution, its S-NSSAI may not be determined. The same may apply for the user plane based solution.

In 3GPP Rel-15, the CN may determine the UE's allowed network slices at UE's registration to the system. The CN may provide the allowed network slices to the UE and RAN. The UE may have configuration information on what slice it should use for a particular application. The CN may also have information on UE's default network slice(s) but this is not indicated between the UE, the RAN and the CN in signalling only connection and there may be several default network slices so it may not be known which one is used for signalling only connection. However, it does not provide this information for RRC connection and the CN and especially the RAN may not know it with only RRC connection/signalling connection. When UE establishes a PDU session, the network slice may be provided as part of the signalling between the CN, the RAN and the UE. The CN and the RAN may use the network slice information for policy/admission control as well as for UE's mobility control.

The valid network slice information may be provided for signalling (e.g. only) connection and/or priority order for allowed network slices. Explicit provision on indicating the used network slice may be preferred. Priority order may not be needed.

The concept of preferred NSSAI list may be introduced in the subscription and/or dynamic policies. This can also take into account operator policies. When the network is congested/overloaded or there are numerous network slices requested by a given UE, preferred NSSAI list can be taken into consideration. URSP rules provided to the UE from PCF should also consider the preferred NSSAI list.

In the method showed on FIG. 5 the RAN and the CN may use the confirmed network slice for policy and admission control, as well as for mobility control when the UE is moving.

Options to convey the network slice information may comprise one or more of the following:

The UE may provide network slice assistance information as requested NSSAI in NAS Message and/or RRC Setup Complete (the UE proposed slice) to the RAN. The RAN may provide network slice assistance information to the CN in an Initial UE message.

The CN may provide allocated network slice information in downlink messages (confirmed default network slice). The confirmed network slice may be different from the requested network slice information.

Both of the above, especially if the CN has changed the UE proposed network slice, the confirmed network slice may need to be provided.

The UDM and/or PCF may also deliver Preferred S-NSSAI list information towards the SMF, the AMF and/or 5GRAN and to the UE which can be leveraged for multiple reasons as explained above.

In summary, there is provided a method to provide network slice information for signaling (e.g. only) connection and/or priority order for allowed network slices. In some examples the priority order is stored at a network apparatus. An explicit provisioning on indicating the used slice may be preferred. A preferred Network Slice Selection Assistance Information (NSSAI) list may be provided in the subscription along with dynamic policies (operator policies). When the network is congested or overloaded or there are numerous slices that are requested by the UE, the preferred NSSAI list may be considered. Also, the URSP rules provided to the UE from the PCF may consider preferred NSSAI list. The UE may provide slice assistance information as requested NSSAI in NAS Message and/or RRC Setup Complete and the RAN to the CN Initial UE message. The CN may provide allocated (confirmed) slice information in downlink messages. The confirmed slice may be different from the requested slice information. If the CN has changed the UE proposed slice, the confirmed slice may need to be provided. The UDM or PCF may also deliver preferred Single NSSAI (S-NSSAI) list information towards SMF, AMF, next generation RAN (NG-RAN) and to the UE which can be leveraged for multiple reasons.

A function of the CN (e.g. UDM) may provide "default S-NSSAI(s)" in determining what are the UE's prioritized slices. Alternatively, there could be additional priority information in the function of the CN (e.g. UDM) or elsewhere in another function of the CN.

The UE may receive the priority information for the (allowed) slices, either by order or by other explicit priority value. The UE may use the priority information when selecting the slice for a PDU session it is requesting (e.g. application service).

Figure 23:
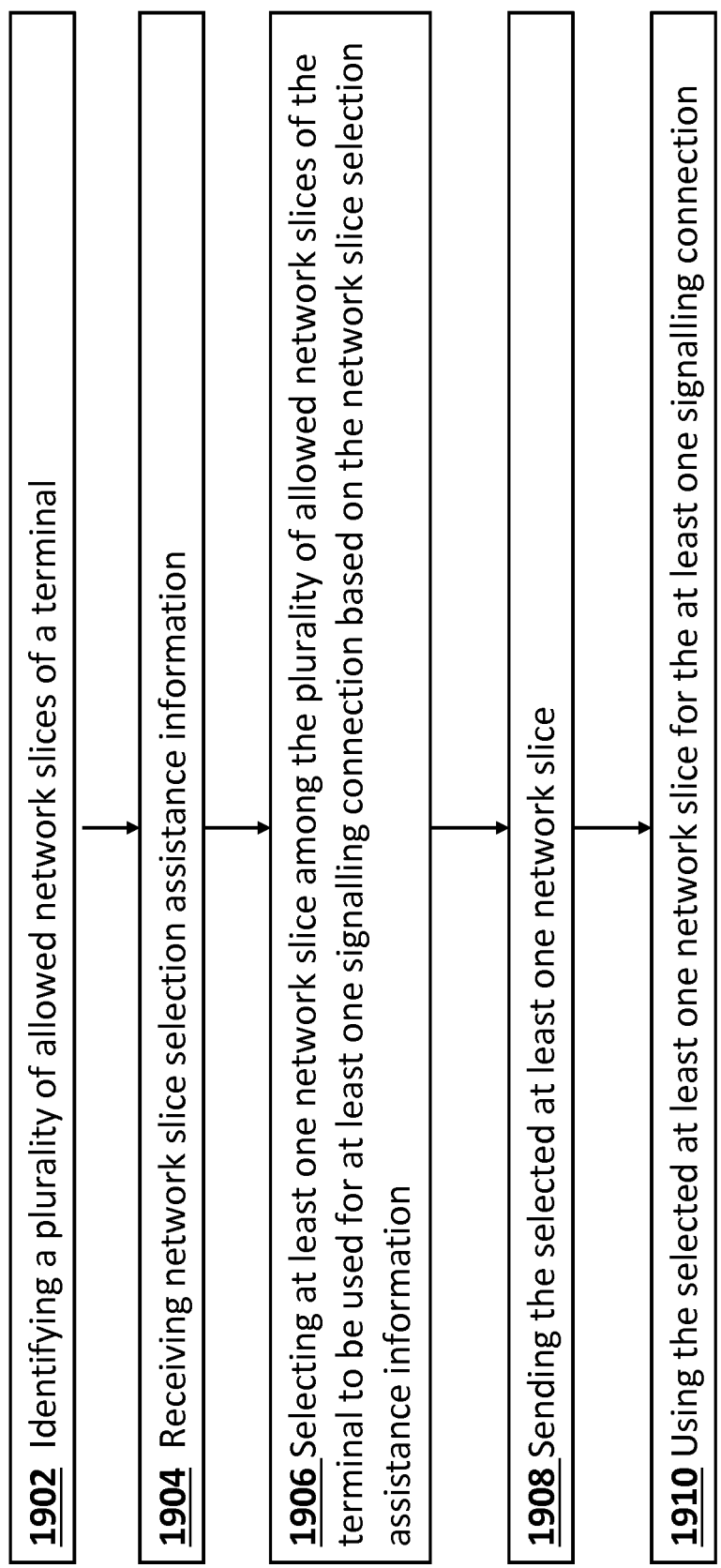
FIG. 23 shows a block diagram of a method for managing network slices for signalling connections performed by a radio access network entity and/or a core network entity.

FIG. 23 shows a block diagram of a method for managing network slices for signalling connections. The method may be performed by a RAN entity (e.g. CU or DU) and/or a CN entity (e.g. AMF, SMF, UDM).

In step 1902 the RAN entity and/or the CN entity may identify a plurality of allowed network slices of a terminal. As discussed above, the plurality of allowed network slices of the terminal may for example be determined when the terminal registers to the system and may be subsequently shared with the RAN entity and/or the CN entity. The plurality of allowed network slices of the terminal may not include any default network slice to be used for a signalling (e.g. only) connection.

In step 1904 the RAN entity and/or CN may receive network slice selection assistance information to assist in the selection of one or more network slices among the plurality of allowed network slices of the terminal to be used for one or more signalling (e.g. only) connection.

The one or more signalling (e.g. only) connections may comprise one or more RRC connection and/or one or more NGAP connection.

The network slice selection assistance information may comprise an NSSAI list included in an S-NSSAI. When the RAN entity receives the network slice selection assistance information, the network slice section assistance information may be received via a RRC Setup Complete message and/or a NAS message. When the CN entity receives the network slice selection assistance information, the network slice section assistance information may be received via an Initial terminal message (i.e. conventionally referred as Initial UE message).

The network slice selection assistance information may comprise one or more proposed network slice (i.e. proposed default network slice) among the plurality of allowed network slices to be used for the one or more signalling (e.g. only) connections. The one or more proposed network slices may be determined by the terminal. Alternatively, the one or more proposed network slices may be determined by another RAN entity and/or another CN entity.

In step 1906, the RAN entity and/or the CN entity may select one or more network slice (i.e. confirmed default network slice) among the plurality of allowed network slices of the terminal to be used for at least one signalling connection based on the network slice selection assistance information.

The selected one or more network slices may be the same as the one or more proposed network slices received in step 1906. Likewise, the selected one or more network slices may be the same as the one or more network slices with the highest priority according to the priority order (i.e. proposed default network slice) received in step 1906.

Alternatively, the selected one or more network slices may be different from the one or more proposed network slices received in step 1906. Likewise, the selected one or more network slices may be different from the one or more network slices with the highest priority according to the priority order received in step 1906.

In step 1908, the RAN entity and/or the CN entity may send the selected one or more network slices. When the RAN entity sends the selected or more network slices, the selected or more network slices may be sent to the terminal. When the CN entity sends the selected or more network slices, the selected or more network slices may be sent to another CN entity or to the RAN entity.

In step 1908, the RAN entity and/or the CN entity may also send back the proposed one or more network slices received in 1906 or the priority order received in 1906.

In step 1910, the RAN entity and/or the CN entity may use the selected or more network slices for the one or more signalling (e.g. only) connection.

Figure 24:
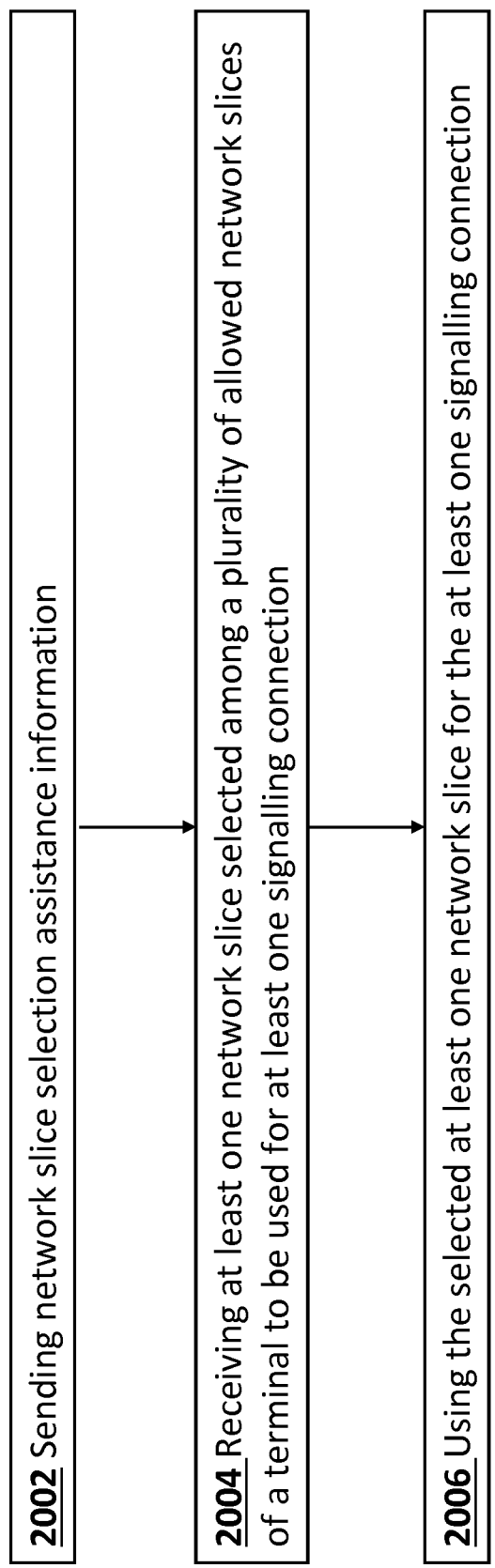
FIG. 24 shows a block diagram of a method for managing network slices for signalling connections performed by a terminal.

FIG. 24 shows a block diagram of a method for managing network slices for signalling connections. The method may be performed by a terminal (e.g. UE).

In step 2002 the terminal may send network slice selection assistance information to a RAN entity. As discussed above, the network slice selection assistance information may comprise an NSSAI list included in an S-NSSAI. The network slice selection assistance information may be sent via an RRC Setup Complete message and/or a NAS message.

The network slice selection assistance information may comprise one or more proposed network slices (i.e. proposed default network slices) among the plurality of allowed network slices of the terminal to be used for one or more signalling (e.g. only) connections. The UE may have received the plurality of allowed network slices in the first place with priority information. The UE may for example select at least one of the plurality of allowed network slices of the terminal to be used for a data connection based on the priority information.

In step 2004, the terminal may receive one or more network slices selected among the plurality of allowed network slices of the terminal based on the network slice selection assistance information sent in step 2002 to be used for the at least one signalling connection (i.e. confirmed default network slice).

In step 2006, the terminal may use the one or more network slices selected among the plurality of allowed network slices of the terminal for the at least one signalling connection.

Figure 25:
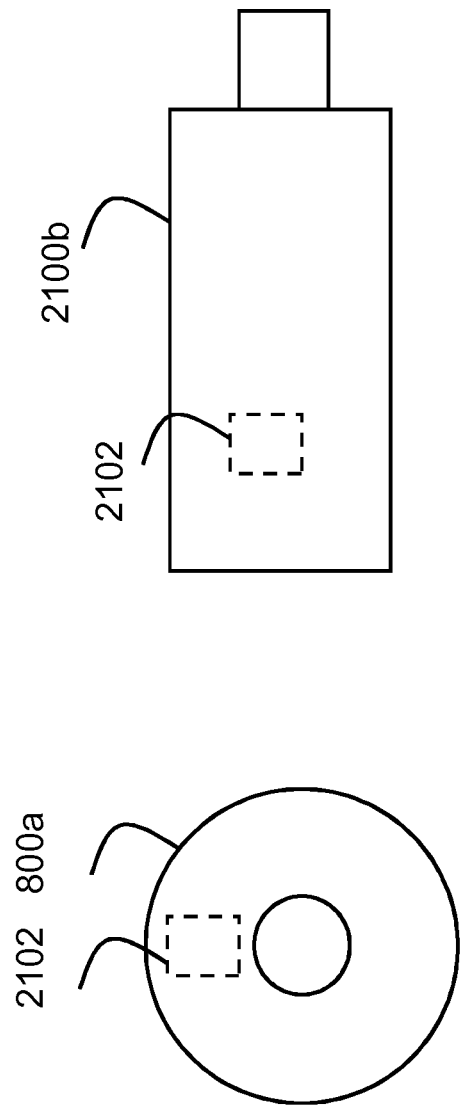
FIG. 25 shows a schematic representation of a non-volatile memory medium storing instructions which when executed by a processor allow a processor to perform one or more of the steps of the method of any of FIGS. 5 to 20.

FIG. 25 shows a schematic representation of non-volatile memory media 2100a (e.g. computer disc (CD) or digital versatile disc (DVD)) and 2100b (e.g. universal serial bus (USB) memory stick) storing instructions and/or parameters 2102 which when executed by a processor allow the processor to perform one or more of the steps of the methods of FIGS. 5 to 20.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5 to 20, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus, comprising:
 at least one processor; and
 at least one memory including computer program code;
 the at least one memory and the computer program code configured to, with the at least one processor, cause the apparatus at least to:
  receive an indication that one or more particular network slices is not available due to network slice specific resources not being available, wherein the network slice specific resources include one or more of resources for a radio resource control (RRC) connection, signaling, location information, control plane based user data, non-guaranteed bit rate (non-GBR), GBR, ultra reliable low latency communication (URLLC), Internet of Things (IoT), or machine type communication (MTC);

identify a plurality of allowed network slices of a terminal;
select at least one network slice among the plurality of allowed network slices of the terminal to be used for at least one signalling connection;
receive network slice selection assistance information;
select the at least one network slice among the plurality of allowed network slices to be used for at least one signalling connection based on the network slice selection assistance information;
apply a priority order with respect to the plurality of allowed network slices, wherein the priority order with respect to the plurality of allowed network slices is provided by a core network entity; and
verify a network slice quota of all other connected terminals before selecting the at least one network slice for the terminal,
wherein the network slice selection assistance information always comprises all of the proposed network slices among the plurality of allowed network slices,
wherein the network slice selection assistance information is included within a radio resource control set up complete message,
wherein the network slice selection assistance information is included within a non-access stratum message,
wherein the network slice selection assistance information is included within an initial terminal message,
wherein the at least one signalling connection comprises a signalling only connection,
wherein the signalling connection comprises a radio resource control connection,
wherein the at least one memory and the computer program code are configured to, with the at least one processor, cause the apparatus to send the selected at least one network slice, and
wherein an ack and nack for resources is indicated explicitly with a specific error code including a no slice resources for RRC connection code, user code, DRB code, NGAP code, or signaling connection code.

* * * * *